(12) United States Patent
Zhi et al.

(10) Patent No.: US 11,177,504 B2
(45) Date of Patent: Nov. 16, 2021

(54) METHOD FOR FABRICATING A POLYMERIC MATERIAL FOR USE IN AN ENERGY STORAGE APPARATUS, A POLYMERIC MATERIAL AND AN ENERGY STORAGE APPARATUS COMPRISING THEREOF

(71) Applicant: City University of Hong Kong, Kowloon (HK)

(72) Inventors: Chunyi Zhi, Shatin (HK); Yan Huang, Shek Kip Mei (HK)

(73) Assignee: City University of Hong Kong, Kowloon (HK)

( * ) Notice: Subject to any disclaimer, the term of this patent is extended or adjusted under 35 U.S.C. 154(b) by 251 days.

(21) Appl. No.: 15/687,834

(22) Filed: Aug. 28, 2017

(65) Prior Publication Data
US 2019/0067737 A1 Feb. 28, 2019

(51) Int. Cl.
*H01M 10/0565* (2010.01)
*H01M 12/08* (2006.01)
(Continued)

(52) U.S. Cl.
CPC ....... *H01M 10/0565* (2013.01); *C08F 120/06* (2013.01); *H01M 4/38* (2013.01); *H01M 4/523* (2013.01); *H01M 4/663* (2013.01); *H01M 4/8652* (2013.01); *H01M 4/8803* (2013.01); *H01M 4/923* (2013.01); *H01M 4/926* (2013.01); *H01M 10/4235* (2013.01); *H01M 12/02* (2013.01); *H01M 12/08* (2013.01);
(Continued)

(58) Field of Classification Search
CPC ......... H01M 10/0565; H01M 10/4235; H01M 2/0275; H01M 4/38; H01M 4/523; H01M 4/663; H01M 4/8652; H01M 4/8803; H01M 4/923; H01M 4/926; H01M 12/02; H01M 12/08; C08F 120/06
See application file for complete search history.

(56) References Cited

U.S. PATENT DOCUMENTS

| 4,307,161 A | * | 12/1981 | Brown | ...................... | H01M 2/30 |
| | | | | | 429/120 |
| 2011/0033747 A1 | * | 2/2011 | Phillips | ................. | H01M 4/244 |
| | | | | | 429/212 |

(Continued)

FOREIGN PATENT DOCUMENTS

CN         102723471      *  10/2012

OTHER PUBLICATIONS

Lee et al., Poly(urethane acrylate)-based gel polymer films for mechanically stable, transparent, and highly conductive polymer electrolyte applications, Journal of Applied Polymer Science, pp. 1-9, publication Mar. 7, 2017.*

(Continued)

*Primary Examiner* — Jayne L Mershon
(74) *Attorney, Agent, or Firm* — Renner Kenner Greive Bobak Taylor & Weber

(57) ABSTRACT

A method for fabricating a polymeric material for use in an energy storage apparatus, a polymeric material, and an energy storage apparatus including the polymeric material, where the polymeric material includes a polymer arranged to combine with a plurality of chemical ions so as to form an ion-conducting material, wherein the ion-conducting material is in solid-state.

21 Claims, 40 Drawing Sheets

(51) Int. Cl.
  *H01M 4/92* (2006.01)
  *H01M 4/86* (2006.01)
  *H01M 4/52* (2010.01)
  *H01M 4/38* (2006.01)
  *H01M 2/02* (2006.01)
  *H01M 4/66* (2006.01)
  *H01M 4/88* (2006.01)
  *H01M 12/02* (2006.01)
  *C08F 120/06* (2006.01)
  *H01M 10/42* (2006.01)
  *H01M 50/116* (2021.01)
  *H01M 12/06* (2006.01)

(52) U.S. Cl.
  CPC ....... *H01M 50/116* (2021.01); *C08F 2438/00* (2013.01); *H01M 12/06* (2013.01); *H01M 2220/30* (2013.01); *H01M 2300/0082* (2013.01); *H01M 2300/0085* (2013.01); *H01M 2300/0091* (2013.01)

(56) References Cited

U.S. PATENT DOCUMENTS

| | | | |
|---|---|---|---|
| 2012/0140378 A1* | 6/2012 | Tan | H01M 4/9016 361/500 |
| 2014/0199591 A1* | 7/2014 | Geng | H01M 4/366 429/213 |
| 2016/0322645 A1* | 11/2016 | Chen | H01M 4/8896 |
| 2017/0207464 A1* | 7/2017 | Gyenge | C25D 9/06 |
| 2017/0338536 A1* | 11/2017 | Fugane | H01M 4/9033 |
| 2018/0358595 A1* | 12/2018 | Kuroiwa | D21H 17/56 |

OTHER PUBLICATIONS

Park et al., All-Solid State Cable-Type Flexible Zinc-Air Battery, Advanced Materials, Communication, pp. 1-6 (Year: 2014).*
Park, J., Park, M., Nam, G., Lee, J. & Cho, J. All-Solid-State Cable-Type Flexible Zinc-Air Battery. Advanced Materials, doi: 10.1002/adma.201404639 (2014).

* cited by examiner

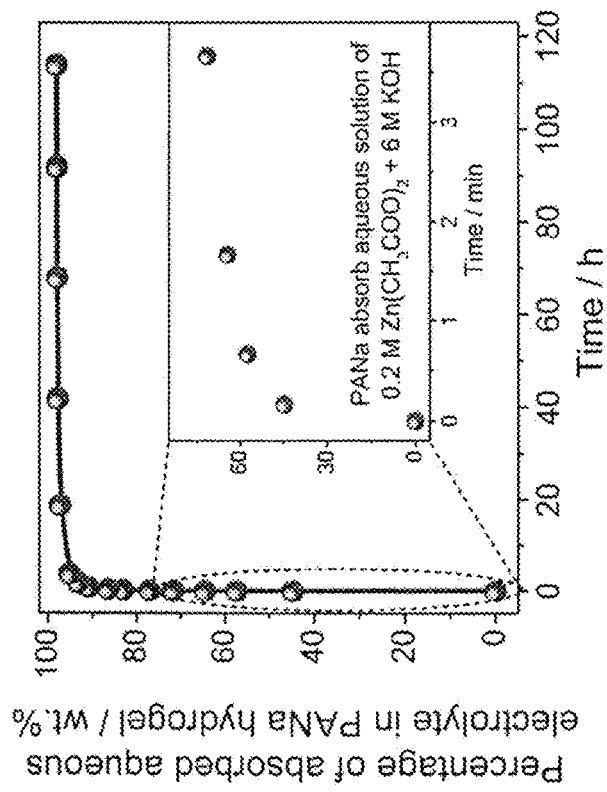
FIG. 4A
FIG. 4B

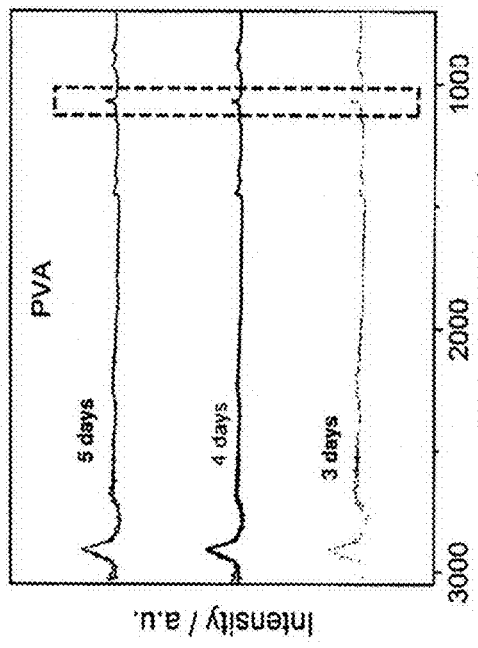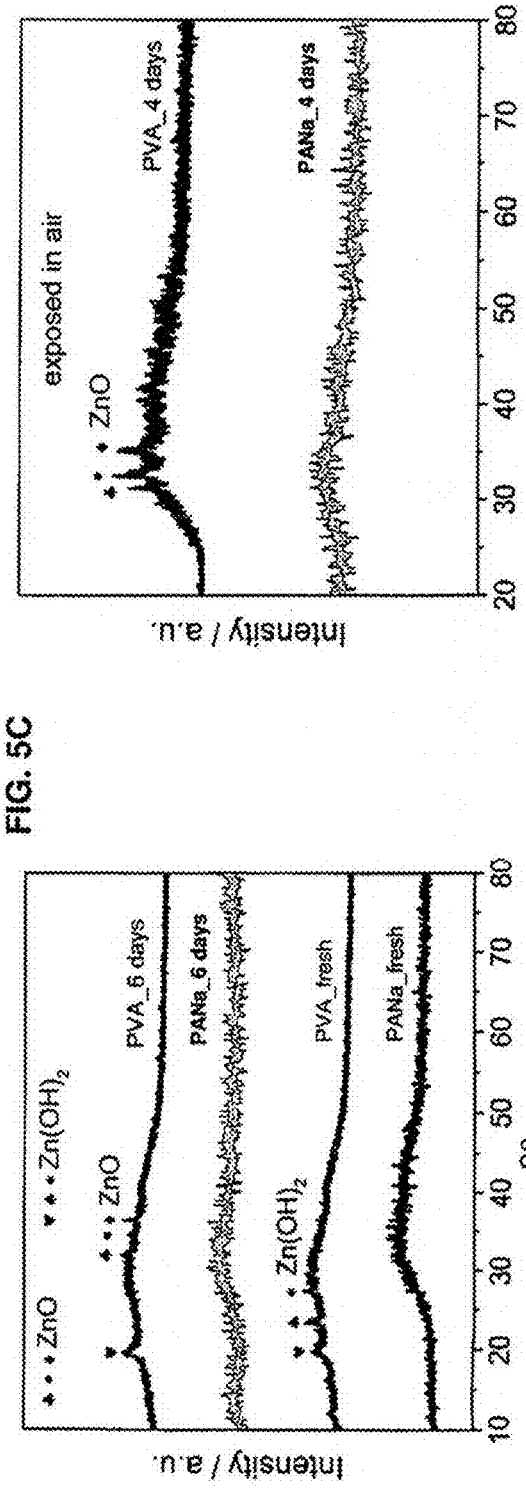

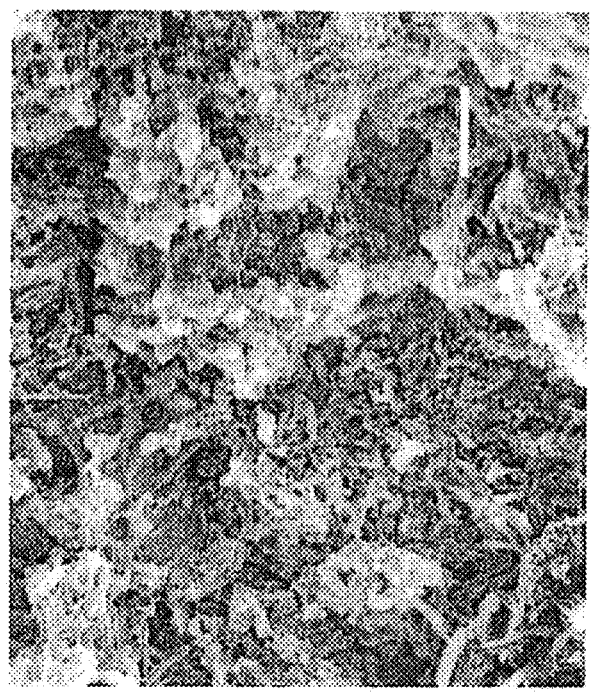
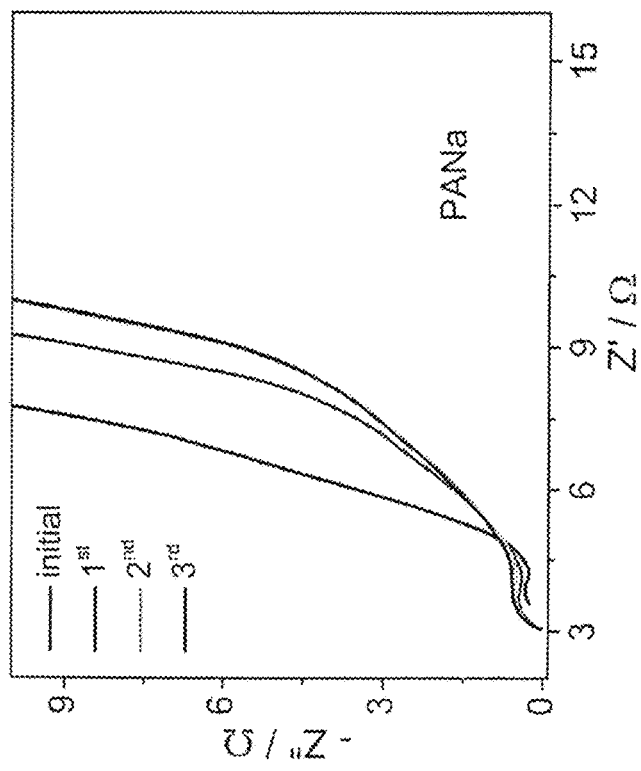
FIG. 6A
FIG. 6B

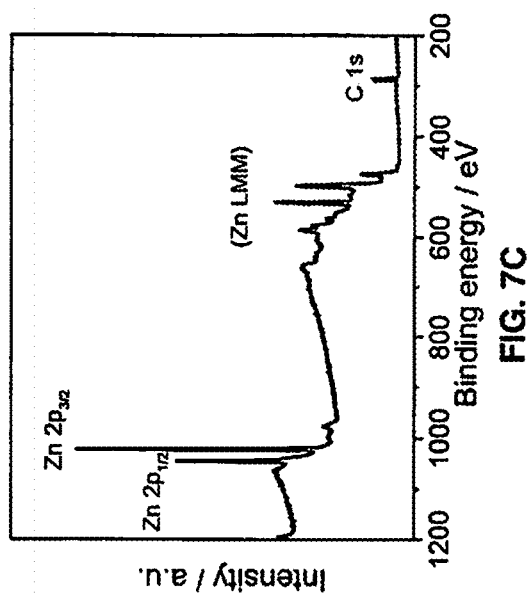
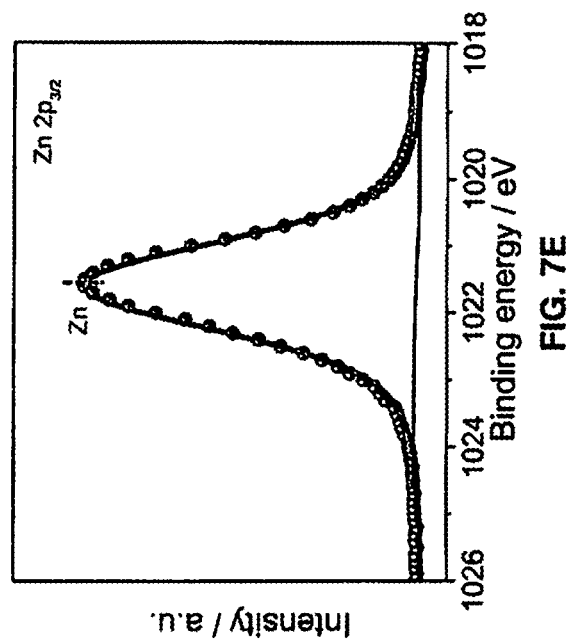
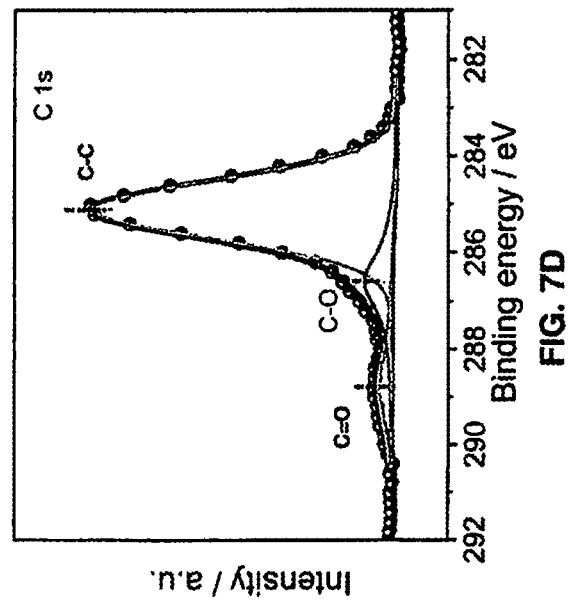
FIG. 7C
FIG. 7D
FIG. 7E

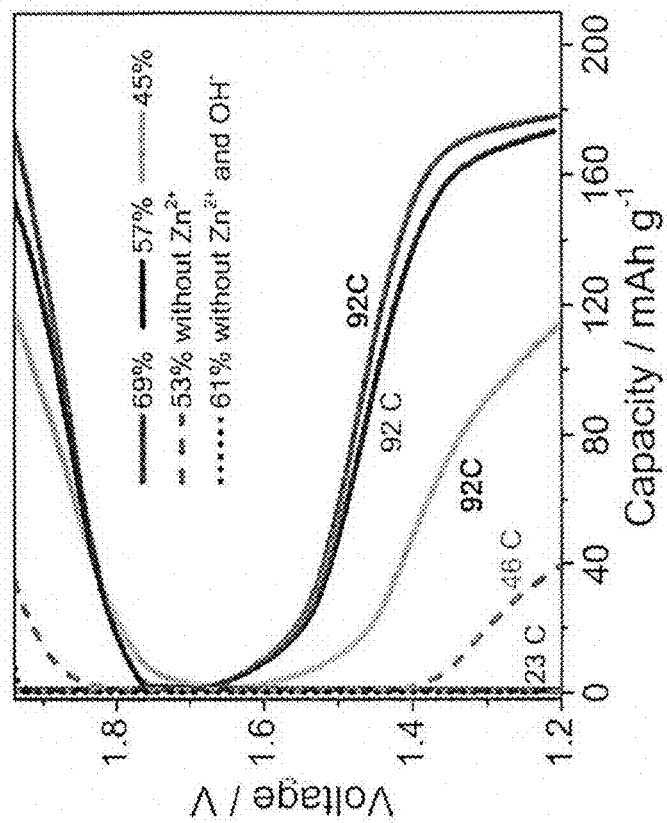
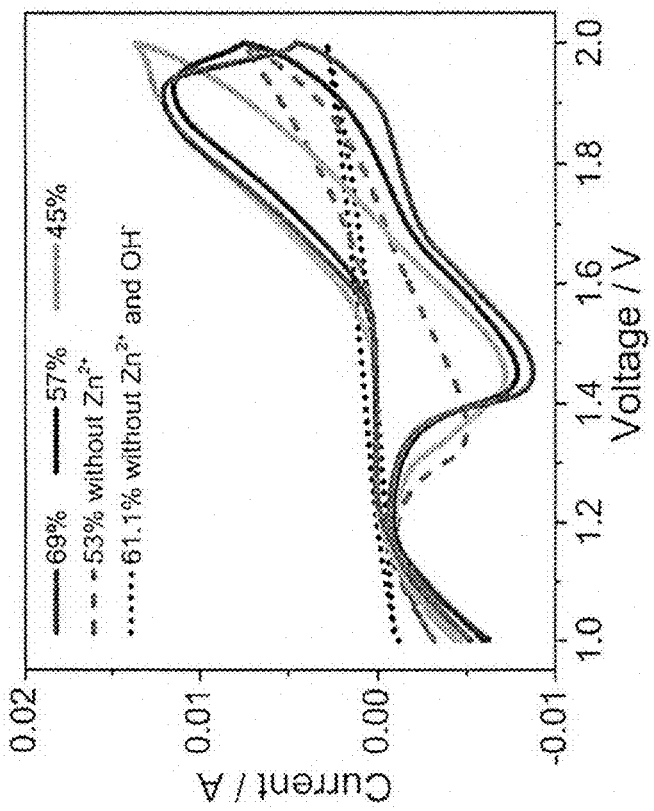
FIG. 13B
FIG. 13A

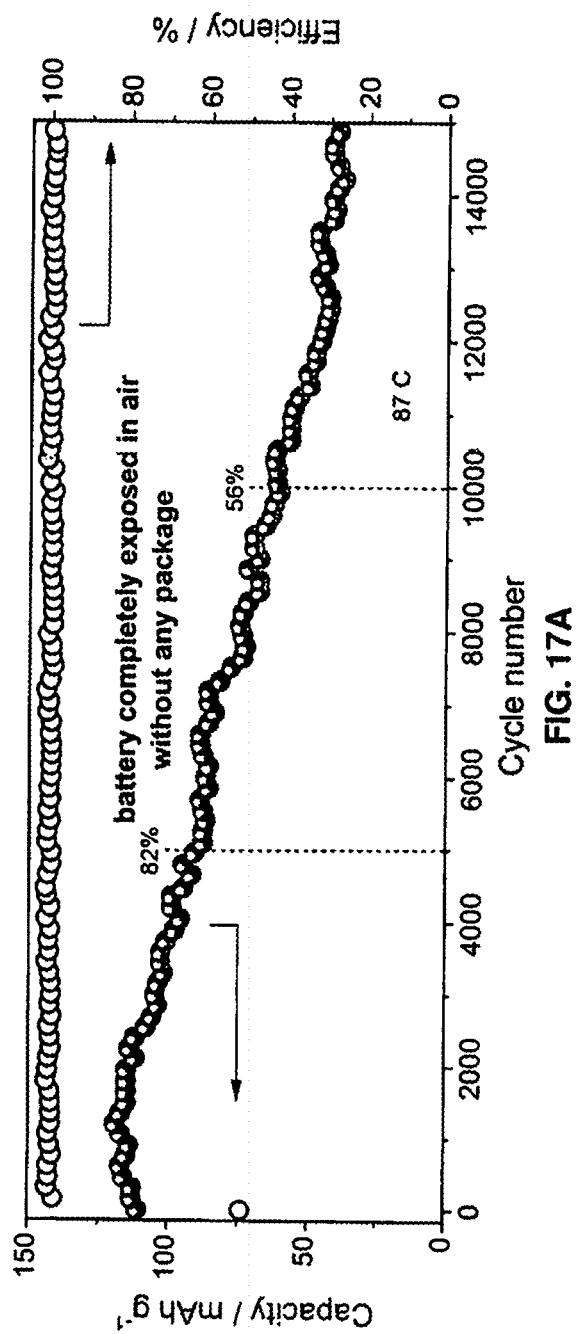
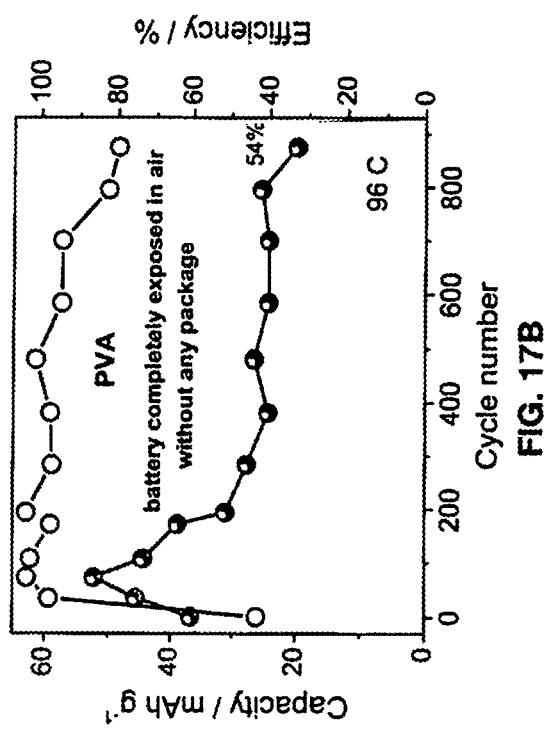
FIG. 17A
FIG. 17B

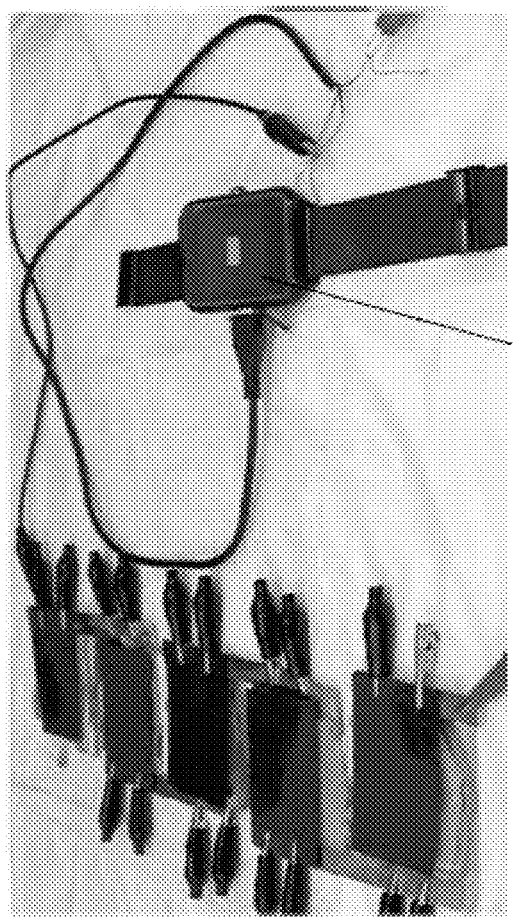
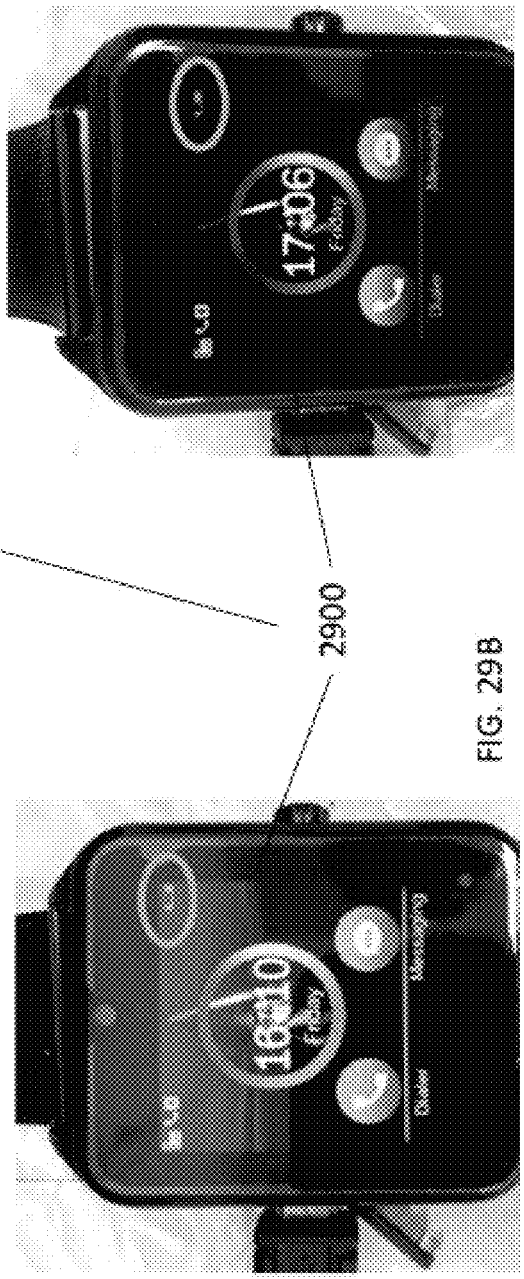
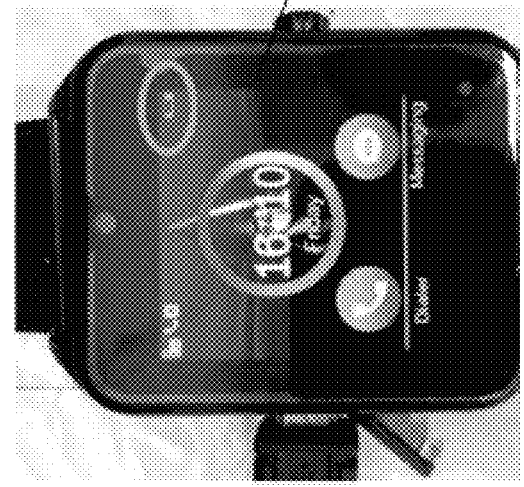
FIG. 29A
FIG. 29B
FIG. 29C

METHOD FOR FABRICATING A POLYMERIC MATERIAL FOR USE IN AN ENERGY STORAGE APPARATUS, A POLYMERIC MATERIAL AND AN ENERGY STORAGE APPARATUS COMPRISING THEREOF

TECHNICAL FIELD

The present invention relates to a method for fabricating a polymeric material for use in an energy storage apparatus, a polymeric material and an energy storage apparatus comprising thereof, although not exclusively, to an all solid-state flexible battery device.

BACKGROUND

Electronic or electrical devices usually operate with suitable energy sources connected thereto. Common energy sources may include electrical sockets in a power grid, photovoltaic cells, fuel cells and batteries.

Portable electric devices, especially wearable devices are usually powered by portable energy sources such as batteries. Batteries are usually manufactured with a rigid shell to isolate the chemical materials from the surrounding environment. However, some batteries may include corrosive electrolytes in liquid or aqueous state, and may damage the electric devices or cause injury to users if the electrolyte leaks through the encapsulation when the batteries operate.

SUMMARY OF THE INVENTION

In accordance with a first aspect of the present invention, there is provided a polymeric material for use in an energy storage apparatus, comprising a polymer arranged to combine with a plurality of chemical ions so as to form an ion-conducting material; wherein the ion-conducting material is in solid-state.

In an embodiment of the first aspect, the ion-conducting material is arranged to operate as an electrolyte in the energy storage apparatus.

In an embodiment of the first aspect, the ion-conducting material is mechanically flexible.

In an embodiment of the first aspect, the polymer includes a hydrogel structure.

In an embodiment of the first aspect, the hydrogel structure is arranged to facilitate retaining an ionic solution including the plurality of chemical ions.

In an embodiment of the first aspect, the ionic solution includes zinc acetate and potassium hydroxide.

In an embodiment of the first aspect, the polymer includes a polyacrylate-based material.

In an embodiment of the first aspect, the polymer includes sodium polyacrylate.

In an embodiment of the first aspect, the polymer is further arranged to suppress a formation of dendrites on an electrode in the energy storage apparatus.

In an embodiment of the first aspect, the polymer comprises an electronegative functional group arranged to interact with electropositive ions produced on the electrode during an operation of the energy storage apparatus.

In an embodiment of the first aspect, the electronegative functional group includes an acrylate group.

In an embodiment of the first aspect, the polymer is arranged to immobilize the electropositive ions produced on the electrode based on an electrostatic interaction between the electronegative functional group and the electropositive ions.

In an embodiment of the first aspect, the electropositive ions are immobilized at an interface between the ion-conducting material and the electrode.

In accordance with a second aspect of the present invention, there is provided a method for fabricating a polymeric material for use in an energy storage apparatus, comprising the steps of: providing a polymer arranged to combine with a plurality of chemical ions so as to form an ion-conducting material; and facilitating an absorption of an ionic solution in the polymer, wherein the ionic solution includes the plurality of chemical ions in the ion-conducting material; wherein the ion-conducting material is in solid-state.

In an embodiment of the second aspect, the ion-conducting material is arranged to operate as an electrolyte in the energy storage apparatus.

In an embodiment of the second aspect, the step of providing the polymer arranged to combine with the plurality of chemical ions further comprising the step of facilitating polymerization of sodium polyacrylate.

In an embodiment of the second aspect, the step of facilitating polymerization of sodium polyacrylate further comprising the step of mixing sodium hydroxide solution with acrylic acid monomers.

In an embodiment of the second aspect, the polymerization involves free-radical polymerization.

In an embodiment of the second aspect, the step of facilitating the absorption of the ionic solution in the polymer includes soaking the polymer in the ionic solution.

In an embodiment of the second aspect, the ionic solution includes zinc acetate and potassium hydroxide.

In accordance with a third aspect of the present invention, there is provided an energy storage apparatus comprising a pair of electrodes including an anode and a cathode; and an electrolyte sandwiched between the pair of electrodes, wherein the electrolyte includes a combination of a polymer and a plurality of chemical ions, and wherein the electrolyte is in solid-state.

In an embodiment of the third aspect, the electrodes and the electrolyte are mechanically flexible.

In an embodiment of the third aspect, the polymer includes a hydrogel structure.

In an embodiment of the third aspect, the hydrogel structure is arranged to facilitate retaining an ionic solution including the plurality of chemical ions.

In an embodiment of the third aspect, the ionic solution includes zinc acetate and potassium hydroxide.

In an embodiment of the third aspect, the polymer includes a polyacrylate-based material.

In an embodiment of the third aspect, the polymer includes sodium polyacrylate.

In an embodiment of the third aspect, the anode includes a zinc electrode.

In an embodiment of the third aspect, the cathode includes a nickel cobalt hydroxide electrode.

In an embodiment of the third aspect, the cathode includes an air electrode.

In an embodiment of the third aspect, the cathode comprises an electrocatalyst.

In an embodiment of the third aspect, each of the electrodes comprises a carbon cloth arranged to retain an electrode material thereon.

In an embodiment of the third aspect, the energy storage apparatus is rechargeable.

BRIEF DESCRIPTION OF THE DRAWINGS

Embodiments of the present invention will now be described, by way of example, with reference to the accompanying drawings in which:

FIGS. 4A, 4B, 4C, 4D, and 4E are plots and an SEM image showing physiochemical characterizations of the PANa electrolyte of FIG. 1 and PVA electrolyte;

FIGS. 5A, 5B, 5C, 5D, and 5E are plots and an SEM image showing Raman and XRD characterizations of the PANa electrolyte of FIG. 1 and PVA electrolyte, before and after aging;

FIGS. 6A, 6B, 6C, 6D, and 6E are plots and an SEM image showing characterizations of the PANa electrolyte-resulted quasi-solid electrolyte interface (quasi-SEI) formation on Zn anodes of FIG. 3;

FIGS. 7A, 7B, 7C, 7D, and 7E are plots and an SEM image showing characterizations of the interface between Zn anode and a PVA electrolyte;

FIGS. 13A, 13B, 13C, and 13D are plots showing the electrochemical performance of Zn//NiCo batteries of FIG. 8A including the PANa polyelectrolyte of FIG. 1 with different parameters of the electrolyte;

FIGS. 17A and 17B are plots showing the cycling performances and the corresponding Coulombic efficiency at C rate of the Zn//NiCo battery including the PANa polyelectrolyte of FIG. 1 and PVA electrolyte respectively, when exposed in air without packaging;

FIGS. 29A, 29B, and 29C are photographic images showing an example operation of the Zn-air batteries of FIG. 8B.

DETAILED DESCRIPTION OF THE PREFERRED EMBODIMENT

The inventors have, through their own research, trials and experiments, devised that flexible or wearable electronics may be implemented in sportswear, military uniforms, and implantable medical devices. These devices may require high performance and highly reliable power sources with excellent flexibility and safety.

Without wishing to be bound by theory, solid-state aqueous rechargeable energy storage and conversion technologies offer inherent safety, flexibility and cost-effectiveness, which may constitute a critical element in personalized portable and flexible electronics.

Among various aqueous rechargeable batteries, in some example embodiments, Zn-based such as Zn//NiCo and Zn-air batteries are preferable due to their high mass energy density (the former has a high output voltage of ~1.8 V leading to energy density comparable to, and the later delivers energy density ~5 times higher than lithium-ion batteries), as well as high abundance and large-scale production of Zn (~2 orders of magnitude lower cost than lithium), etc.

However, aqueous batteries may include a poor cycling stability. Some example aqueous batteries may only sustain tens to hundreds of charging-discharging cycles. Especially for the aqueous batteries in corrosive media, such as KOH as electrolyte, the issue becomes even more complicated with fast degradation of electrolyte and electrode under the highly corrosive environments.

The cycling stability and capacity may be improved by incorporating different electrode designs. Unfortunately, the improvements are found to be limited and the enhancements may only be achieved in liquid-state aqueous electrolytes and they are lost significantly in solid-state batteries. The tremendous loss of the aqueous batteries' performance in solid-state electrolytes when compared to the liquid electrolytes may indicate that, instead of the electrodes, the solid-state electrolyte may be more important in the solid-state electrochemical devices.

Some batteries may include indispensable polymer electrolytes (e.g., polyvinyl alcohol (PVA), polyethylene glycol (PEG), gelatin, etc.). In solid-state batteries, the electrolyte may limit the capacity and cycling stability of the batteries owing to its intrinsic defects: limited water take-up (i.e., low ionic conductivity), poor water retention, poor interaction with electrodes and structural instability. Thus, these intrinsic defects of polymer electrolytes impose a considerable requirement on developing a different polyelectrolyte to fundamentally resolve the disadvantages of limited capacity and poor cycling stability of solid-state aqueous rechargeable batteries.

Preferably, the electrolyte may include the features of effective ionic transport, superior water-retaining capability and effective electrode/electrolyte interface during charging/discharging.

Figure 1:
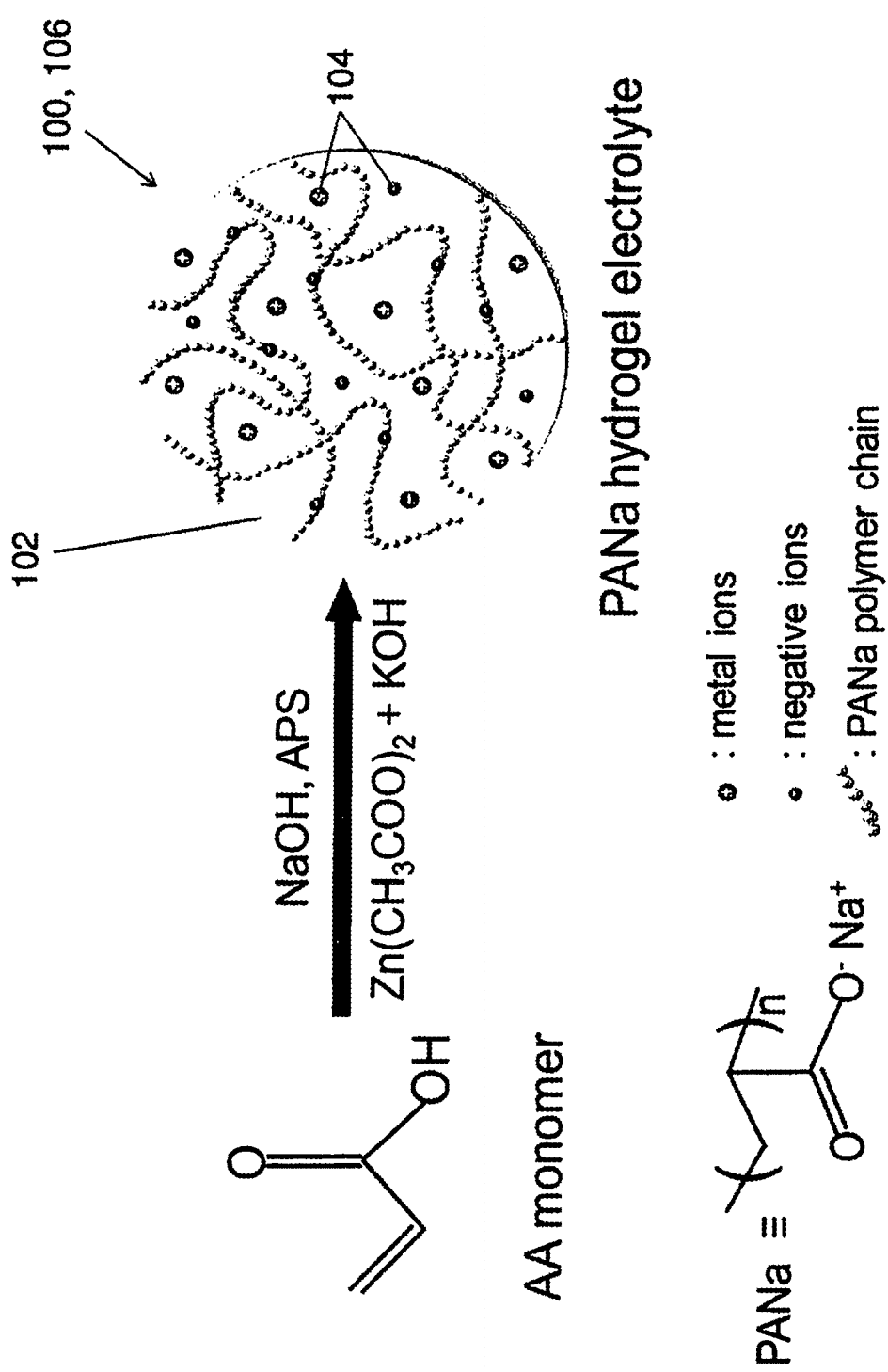
FIG. 1 is an illustration of a polymeric material and a method for fabricating the polymeric material for use in an energy storage apparatus in accordance with one embodiment of the present invention.

With reference to FIG. 1 there is shown an example embodiment of a polymeric material 100 for use in an energy storage apparatus, comprising a polymer 102 arranged to combine with a plurality of chemical ions 104 so as to form an ion-conducting material 106; wherein the ion-conducting material is in solid-state.

In this embodiment, the polymeric material 100 may be included as an electrolyte between electrodes in a battery device so as to facilitate the transportation of the ions therebetween during the operations, such as charging and discharging, of the batteries. During these operations, electropositive and/or electronegative charge ions 104 may move within the electrolyte in response to the chemical reaction at the electrodes, namely the cathode and the anode of the battery device.

As discussed earlier in this disclosure, the electrolyte in a battery device is preferred to include the features of effective ionic transport, superior water-retaining capability. The polymeric material 100 may comprise a water-retaining polymer 102 which may effectively retain a solution of an ionic salt, thereby combining with the chemical ions 104 and forming an ion-conducting material 106. Thus the ion-conducting material may operate as an electrolyte in an energy storage apparatus such as a battery.

Referring to FIG. 1, the polymeric material 100 may be includes a hydrogel structure, which may include (but not limited to) a polyacrylate-based material or sodium polyacrylate (PANa). These polymers or hydrogel structures include a hydrophilic functional group which may facilitate retaining water or an ionic solution including a plurality of chemical ions 104, while allowing the mobile ions 104 to move within the hydrogel structure. Therefore the polymeric material 100 includes an ion-conductivity which is sufficient for being used as an electrolyte in a battery device.

Preferably, hydrogel may be used as a host of water and free-moving ions due to its high absorbency, behind which the driving force is an osmotic pressure difference arising from the concentration of ionic groups inside the hydrogel network.

Figure 2B:
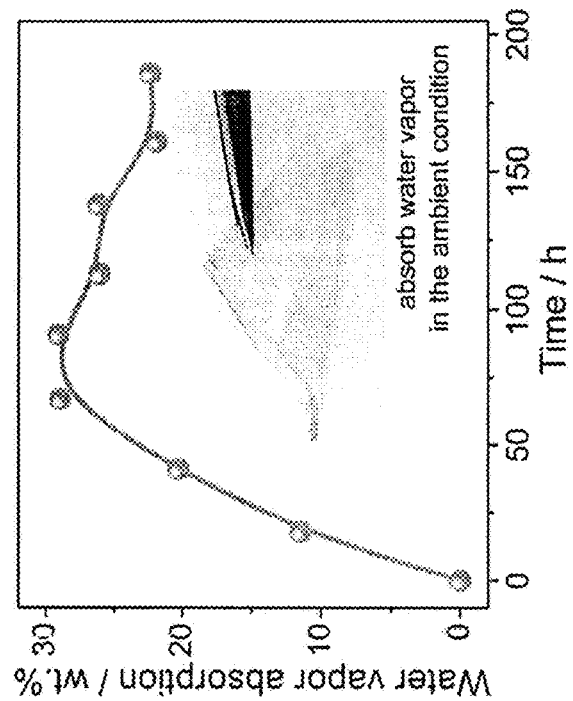
FIG. 2B is a plot showing PANa absorb water vapor in the ambient condition, wherein the inset is an image of an initially dry PANa film after absorption of water vapor in the ambient condition.
Figure 2A:
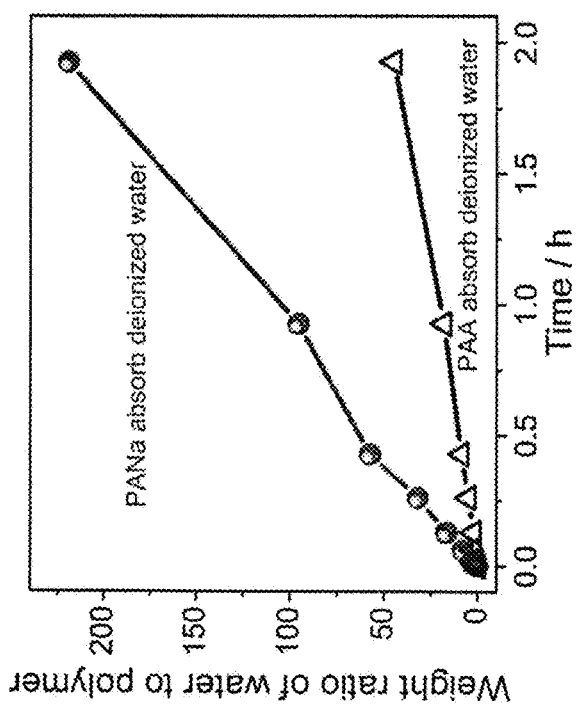
FIG. 2A is a plot showing water absorbency of PANa (circle) and PAA (triangle) absorbing deionized water. b.

With reference to FIGS. 2A and 2B, the water absorbency of different hydrogel may vary with species. PANa, as a superabsorbent polymer, may absorb water 220 times the weight of its own in less than 2 h. On the other hand, as another example hydrogel, polyacrylic acid (PAA) may absorb water 45 times the weight of its own. The superabsorbency of PANa is further revealed by the fact that it may absorb water vapor in the air up to ~30% wt., depending on the relative humidity in the ambient environment.

Hydrogel may also change its structure in response to the absorbed content. Referring to FIG. 2B, the initially dry PANa film 100 becomes soft and flexible after absorption of water vapor from the ambient air. Thus the ion-conducting material is mechanically flexible.

Besides the superabsorbency, PANa can well retain its water content. These validate its application as a high-performance polyelectrolyte for both energy storage and conversion technologies.

With reference back to FIG. 1, the fabrication of the polymer material 100 may involve a solution polymerization process for synthesizing the PANa hydrogel. This includes polymerization of sodium polyacrylate to obtain the polymer 102 or the PANa hydrogel and to facilitate the absorption of ionic solution in the PANa hydrogel so as to obtain the ion-conducting and flexible material. The ion-conducting PANa hydrogel 106 may be further included in a battery device.

Preferably, the polymerization of sodium polyacrylate involves mixing sodium hydroxide solution with acrylic acid monomers. Acrylic acid (AA) monomers may be neutralized by NaOH and then polymerized to form PANa by means of ammonium persulfate (APS) as the initiator, subsequently, the a free-radical polymerization process may take place and finally a dried PANa hydrogel may be obtained.

In addition, the fabrication process includes soaking the polymer 102 in an ionic solution, such as zinc acetate and potassium hydroxide. The selection of the ionic solution(s) is based on different types or composition of the desired battery devices. For example, a zinc-based battery requires zinc ions in the fabricated electrolyte, therefore a solution of a zinc-based salt is used.

After the preparation of the PANa hydrogel 102, a concentrated solution of $Zn(CH_3COO)_2$ (0.2 M) and KOH (6 M) are vastly absorbed by the PANa, serving as a regulator of water and ion content in the synthesized PANa hydrogel electrolyte 106. In addition, the polymer 102 comprises an electronegative function group, such as an acrylate group, to interact with electropositive ions produced on the electrode during an operation of the battery, therefore may efficiently suppress a formation of dendrites on a metal electrode in the battery.

Figure 3:
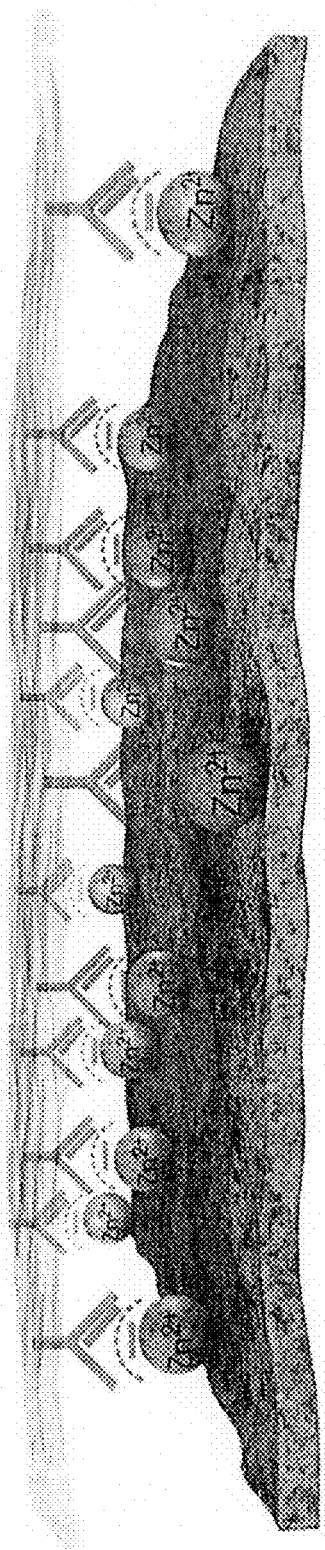
FIG. 3 is a schematic illustration of the quasi-SEI formation between Zn anode and a PANa electrolyte in an energy storage apparatus in accordance with an embodiment of the present invention.

With reference to FIG. 3, the polymer 102 may also immobilize the electropositive ions 104 produced on the electrode 108 based on an electrostatic interaction between the electronegative functional group 110 and the electropositive ions 106. Preferably, the electropositive ions 104 (the $Zn^{2+}$ ions as shown in FIG. 3) are immobilized at an interface between the ion-conducting material 106 and the electrode 108 by the acrylate groups 110 of the polymer 102.

The fabricated PANa hydrogel has the following advantages. First, the PANa absorb and retain variable contents of water and free-moving ions, thus tuning the ionic conductivity. Second, the vast absorption of optimized 6 M KOH+ 0.2 M $Zn(CH3COO)_2$ ensures its intrinsically good ionic conductivity and low viscosity. Third, the PANa polymer chains provide sufficient acrylate ions at the interface between electrolyte and Zn anode, facilitating the formation of quasi-SEI during initial cycles. Advantageously, this may eliminate zinc dendrites which were prevalent in aqueous and PVA-based electrolytes. These synergistic effects mentioned above may improve the battery performance by enhancing the high capacity and ultra-cycling stability observed from both Zn//NiCo and Zn-air batteries by the use of the polyelectrolyte in accordance with the embodiments of the present invention.

In an exemplary fabrication process, a concentrated sodium hydroxide solution (27 mL, 25 M) is slowly dropped in an aqueous solution of acrylic acid monomers (54 mL, 47 wt. %) in 12 hours. Prior to use, the acrylic acid monomer was purified by distillation under reduced pressure and stored in a refrigerator. Ammonium persulfate (0.78 g) was then added into the neutralized solution and stirred for 0.5 h at room temperature. After the magnetic stirring, the solution was degassed and sealed under N2 to remove the dissolved oxygen. Next, free-radical polymerization was allowed to proceed at 40° C. for 30 h. Finally, the as-prepared polymer was fully dried at room temperature and then soaked in a mixed solution (500 mL) of zinc acetate (0.2 M) and potassium hydroxide (6 M) up to one week to achieve the equilibrated state.

The inventors have performed material characterizations of PANa hydrogel polymer so as to evaluate its performance in a battery device. Referring to FIG. 4A, the concentration and mobility of ions is of primary importance for an electrolyte, which are both tightly associated with water incorporated in it. Benefited from the superabsorbency, the PANa hydrogel can absorb 72% wt. of the concentrated solution (0.2 M $Zn(CH3COO)2+6$ M KOH) in less than 4 min, and reach an equilibrium state (98% wt.) in one day.

With reference to FIG. 4B, a scanning electron microscopy (SEM) image of the freeze-dried sample shows abundant micropores in the hydrogel available for filling by the concentrated solution. Such high concentration of free-moving ions in the greatly swollen network enables superior ionic conductivity. With the increase in the water content, ions in the PANa hydrogel move more easily, and the PANa chains are more sufficiently extended.

Figure 4C:
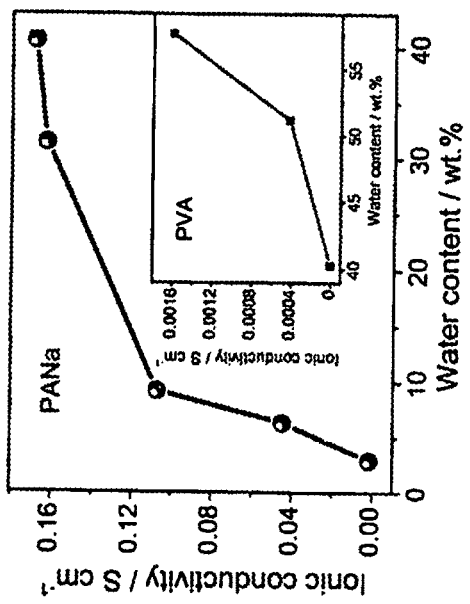

With reference to FIG. 4C, the ionic conductivity was found to increase remarkably to 0.17 S cm$^{-1}$ with increasing water content, being up to 3 orders of magnitude higher than that in some example polymer electrolytes.

Figure 4E:
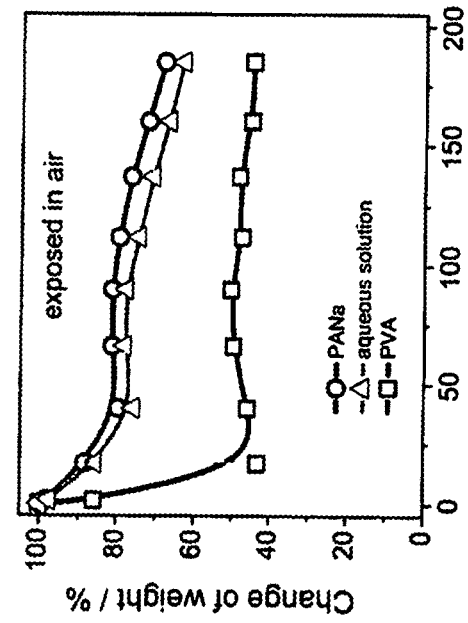
Figure 4D:
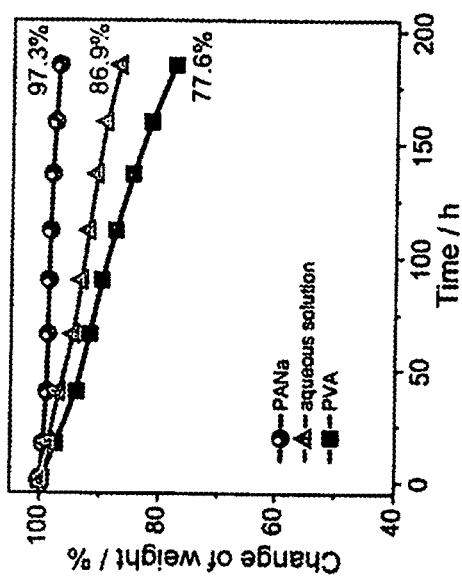

With reference to FIG. 4D, more importantly, the PANa hydrogel electrolyte is also superior in retaining water. The volatilized water is only 2.7% in 185 h, much less than the liquid-state electrolyte (13.1%) and the conventional PVA (22.4%). Therefore, the superior conductivity and water retention capability validates the use of PANa hydrogel as the electrolyte of high-performance Zn-based batteries.

With reference to the FIG. 4E, being exposed in the air, the weight of PANa hydrogel can retain 68% in 185 h, better than even the liquid-state electrolyte (64%) and much better than PVA (45%).

Figure 5B:
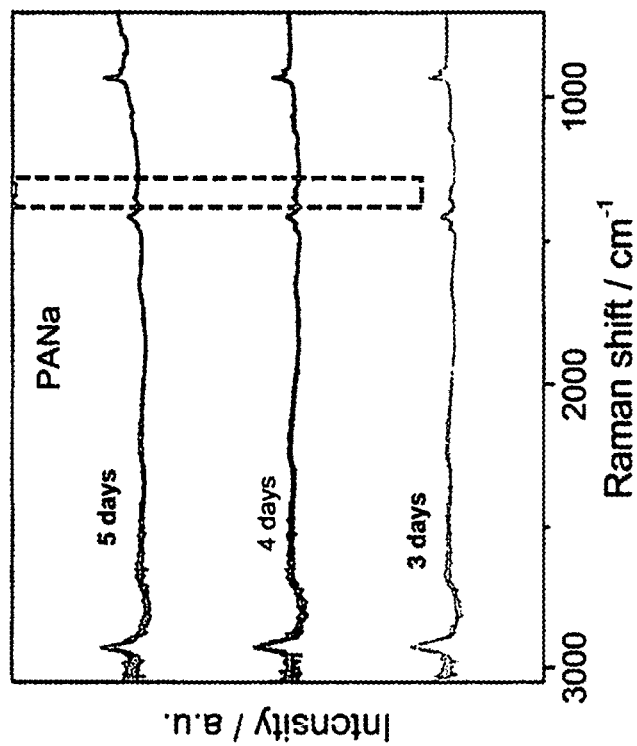
Figure 5A:
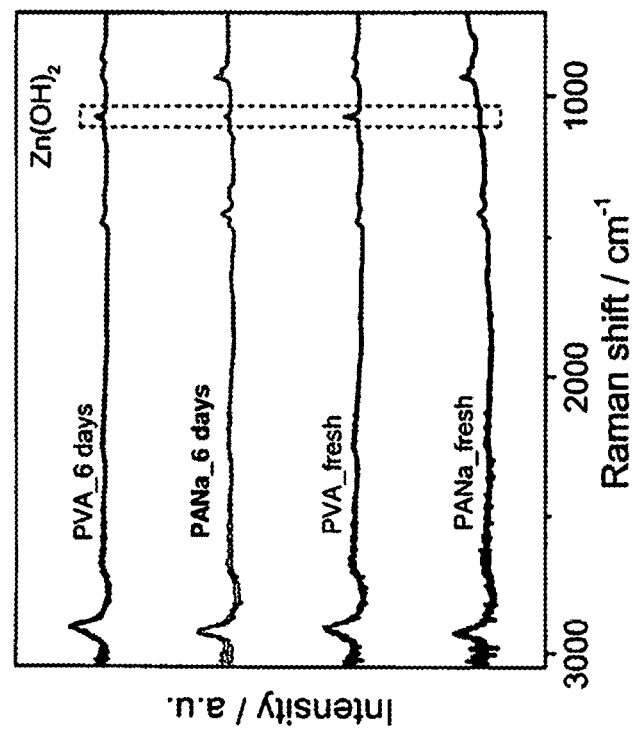

The superabsorbency and water retention capability are also reflected by Raman and X-ray diffraction (XRD). With reference to FIGS. 5A and 5B, both the fresh PANa hydrogel electrolyte and the electrolyte aged up to 6 days have very similar Raman spectra and XRD patterns, which confirm no precipitation of $Zn(OH)_2$. By contrast, with reference to FIG. 5C, the peak at 1072 cm$^{-1}$ is remarkable in the fresh PVA electrolyte.

This suggests that $Zn(OH)_2$ crystals have already precipitated even in the fresh PVA electrolyte, which explains its inferior capacities in a battery device including such PVA electrolyte. With reference to the XRD profile as shown in FIGS. 5D and 5E, it is further confirmed that the species of $Zn(OH)_2$ crystals exist in all aged PVA electrolytes, some of which even dehydrate to ZnO after the 6-day aging. In contrast, no precipitation of $Zn(OH)_2$ appears in all aged PANa electroltyes.

All these indicate that the PVA electrolyte cannot hold water as much as the PANa and even worse, it keeps losing water during repetitive charge/discharge. Therefore, the superior capability of water absorption and retention in the PANa hydrogel electrolyte greatly contribute to the high capacity and ultra-long cycling stability of the Zn-based energy storage and conversion devices.

Apart from the abovementioned water absorption and retention, preferably, the electro-negatively polarized lone pairs at oxygen atom of acrylate groups in the PANa backbone, induces analogous properties to that of the SEI, so-called quasi-SEI as discussed earlier with reference to FIG. 3. The electrostatic interaction between electronegative acrylate groups in the PANa electrolyte and electropositive zinc ions produced from the Zn anode oxidation should modulate the desolvation process of zinc ions, immobilize and protect the Zn anode from dendrites. The high ionic conductivity of the quasi-SEI layer affords uniform distribution of zinc-ion flux, facilitating the easy and uniform transport of zinc ions throughout the whole electrode surface.

The inventors have also characterized the polymeric material using electrochemical impedance spectroscopy (EIS). The high-frequency and medium-frequency semicircles are attributed to the quasi-SEI resistance (Rqs) and charge transfer resistance (Rct), respectively. The incline at low frequency is Warburg impedance ($Z^w$) corresponding to the ion diffusion process within the electrode.

With reference to FIG. 6A, Rqs start to appear in the cycled battery and achieves equilibrium in 3 cycles. Compared to the pristine battery, no increase in $Z^w$ is observed after cycles, indicating unaffected ion diffusion process due to the high ionic conductivity of the quasi-SEI.

With reference to SEM image of the Zn anode after 15 cycles as shown in FIG. 6B, this further confirms the existence of quasi-SEI, leading to the good cycling performance. The XPS study also suggests that the interface between anode and electrolyte is functionally modified by the PANa acting quasi-SEI.

Figure 6C:
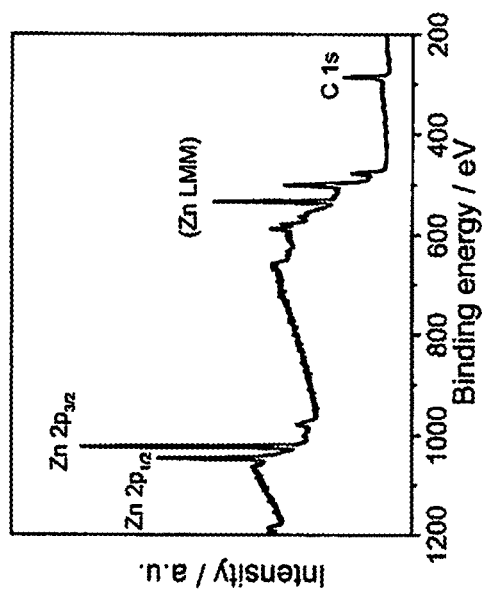
Figure 6E:
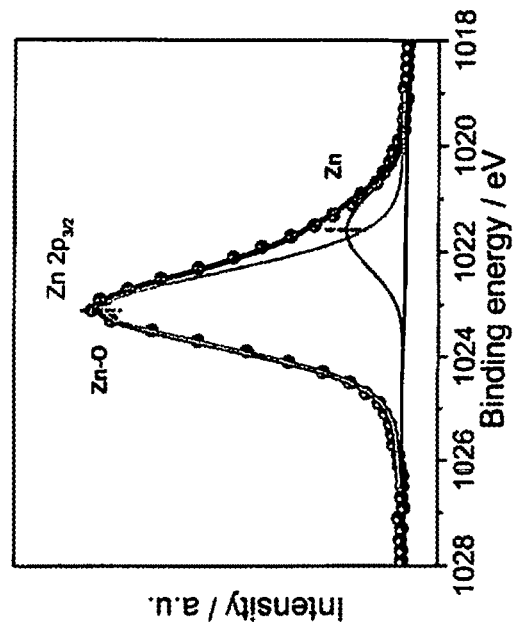
Figure 6D:
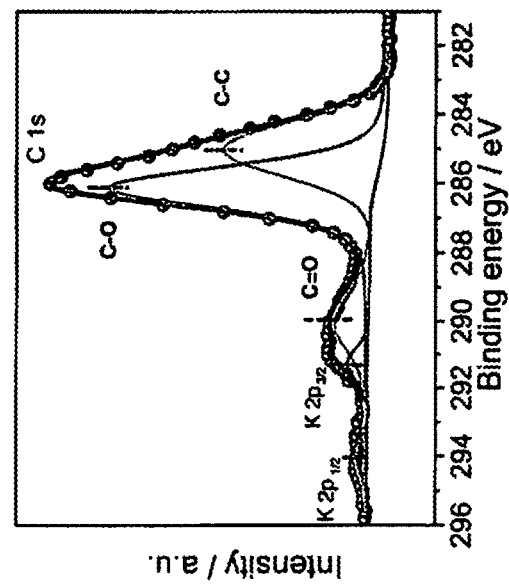
Figure 7A:
Figure 7B:
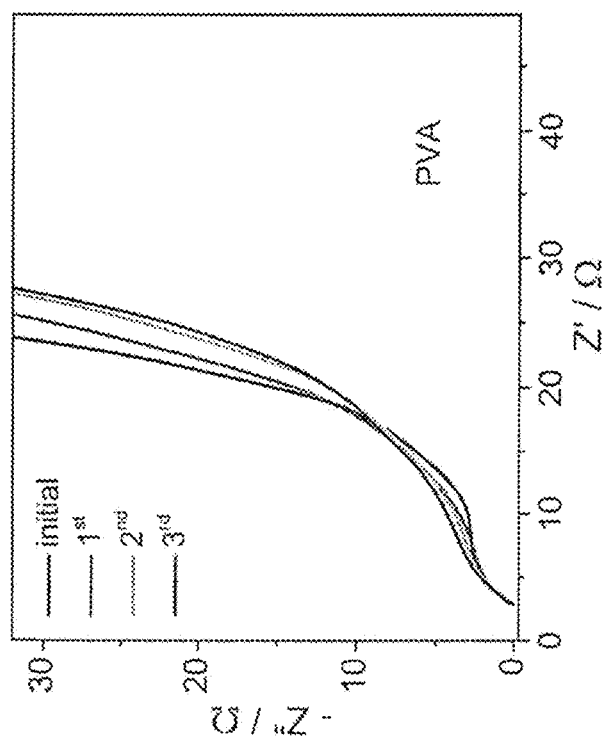

With reference to FIG. 6C, there is shown a full spectrum ranging from 200-1100 eV, with the strong peaks of main elements. Further referring to the high-resolution spectra with reference to Figures of FIGS. 6D-6E, C 1s and Zn 2p show characteristic peaks of C—O, C=O and Zn—O, all indicating the existence of acrylate groups-faciliated quasi-SEI. The negatively charged acrylate groups interact with positively charged $Zn^{2+}$ ions. This electrostatic interaction between the PANa electrolyte and the Zn anode allows for uniform ion transport throughout the whole electrode surface, thus protecting against dendrite formation.

In contrast, with reference to FIGS. 7A to 7E, no obvious Rqs is observed from the Nyquist plot of battery with the PVA electrolyte. Furthermore, clear Zn dendrites without quasi-SEI appear on its Zn anode after 15 cycles. These are because there is no bond formed between the PVA network and the zinc anode. The XPS study also suggests that the interface between anode and electrolyte is unmodified by the PVA. A full spectrum ranging from 200-1100 eV displays the strong peaks of main elements. However, the characteristic peaks in the high-resolution spectra of C 1s and Zn 2p are very different from those in the case of PANa with reference to FIG. 6. Especially in the Zn $2p_{3/2}$ spectrum, there is solely a strong Zn peak, indicating the absence of bond interaction between the anode and the PVA electrolyte.

Figure 8B:
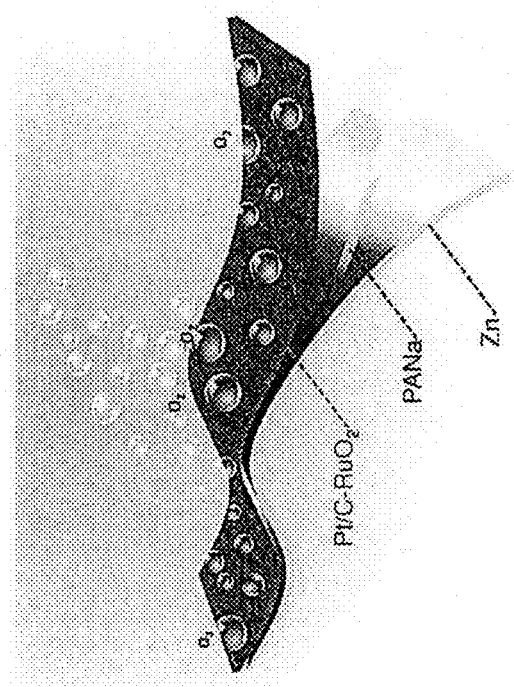
FIGS. 8A and 8B are illustrations of an energy storage apparatus in accordance with two embodiments of the present invention.
Figure 8A:
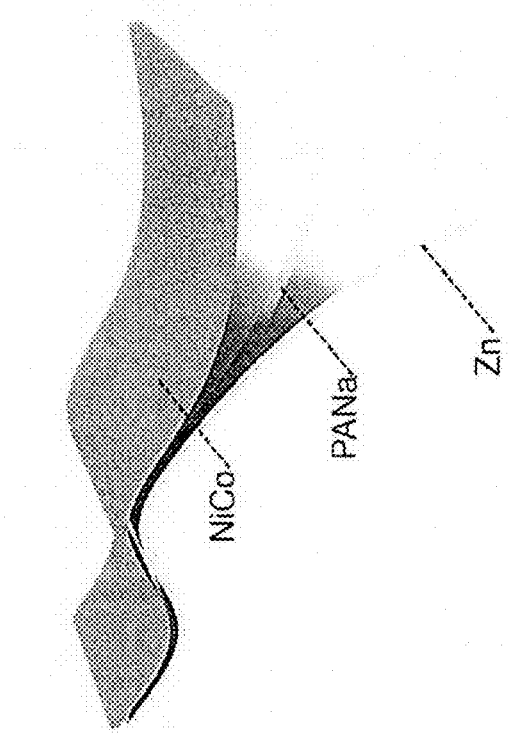

With reference to FIGS. 8A and 8B, there is provided example embodiments of an energy storage apparatus 800 comprising a pair of electrodes 802 including an anode 802A and a cathode 802C; and an electrolyte 100 sandwiched between the pair of electrodes 800, wherein the electrolyte 100 includes a combination of a polymer and a plurality of chemical ions, and wherein the electrolyte is in solid-state.

Preferably, the electrolyte between the electrodes 802 may include the polymeric material 100 in accordance with the previously mentioned embodiments. This may include a PANa hydrogel 102 soaked with an ionic solution, thus ions 104 may travel from one electrode to another through the sandwiched hydrogel electrolyte 100. In addition, both the electrodes 802 and the electrolyte 100 are provided in solid-state while being mechanically flexible, which allows the energy storage apparatus 800 being used as a rechargeable battery device in wearable electronic devices and appliances with a non-planer battery cavity.

Referring to FIG. 8A, in a first embodiment of the energy storage apparatus 800A or the battery, the anode 802A includes a zinc electrode and the cathode 802C includes a nickel cobalt hydroxide electrode. Preferably, the electrode materials may be deposited on a carbon cloth arranged to retain the electrode material thereon.

Figure 9B:
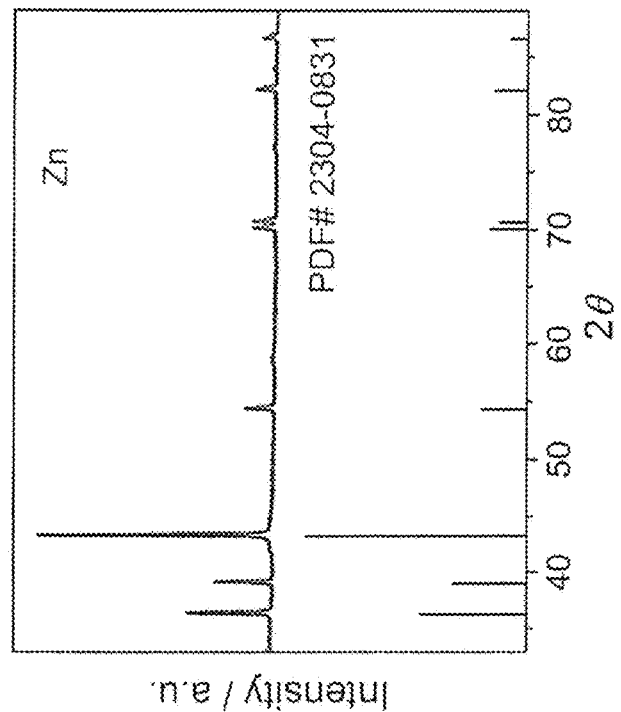
FIGS. 9A and 9B are an SEM image and a plot showing a characterization of an electroplated Zn electrode in the battery of FIG. 8A.
Figure 9A:

For example, the Zn//NiCo batteries 800A may be fabricated by directly paving a Zn anode 802A and a NiCo hydroxide cathode 802C (indicated as "NiCoO") on the as-synthesized PANa film electrolyte 100 without a binder or separator. The Zn electroplated on a carbon cloth (which acts as a good current collector) has a typical morphology of nanoflakes referring to FIG. 9A, of which the diffraction peaks are well indexed to referring to FIG. 9B. It also shows identical crystal structures with the standardized Zn samples.

Figures 10A, 10B:
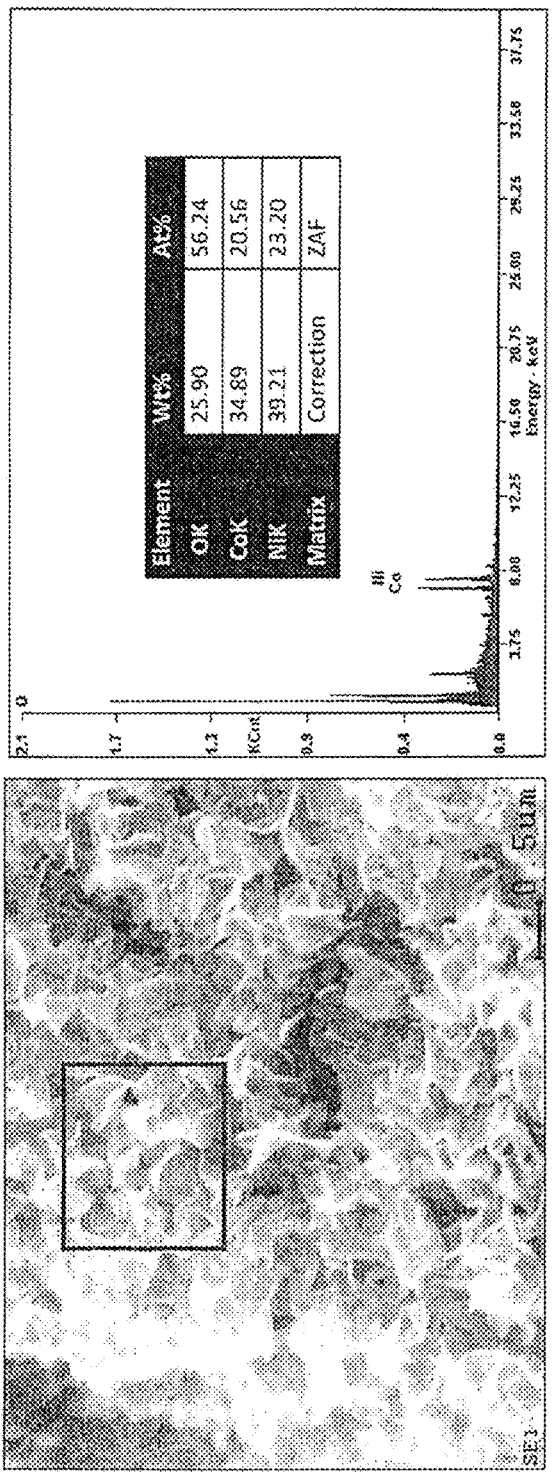
FIGS. 10A and 10B are an SEM image and a plot showing a characterization of an electrodeposited NiCoO electrode in the battery of FIG. 8A.

With reference to FIGS. 10A and 10B, the NiCoO shows untrathin mesoporous nanosheets with an atomic ratio around 1:1:3 (Ni:Co:O), being consistent with that of Ni to Co in precursor. These structures are beneficial for increasing surface area and ion transport during charge/discharge.

In an example fabrication process of the battery 800A, a carbon cloth (width: 1 cm; length: 5 cm) was utilized as current collectors. Zn anodes were fabricated by electrodeposition at −0.8 V vs. Zn foil for 5 min in 1 M zinc sulfate at room temperature. In cycling tests, polished Zn foils were used. NiCo hydroxide cathodes were fabricated by electrodeposition at −1 V vs. SCE for 20 min in a solution of 5 mM nickel nitrate and 5 mM cobalt nitrate at room temperature. The Zn anode and the cathode were paved on each side of the PANa film under ambient conditions. Thus, the solid-state batteries were obtained with the electrolyte also serving as a separator.

With reference to FIGS. 11A to 11D, detailed elemental oxidation states of the NiCoO are obtained from X-ray photoelectron spectroscopy (XPS).

Figures 11A, 11B:
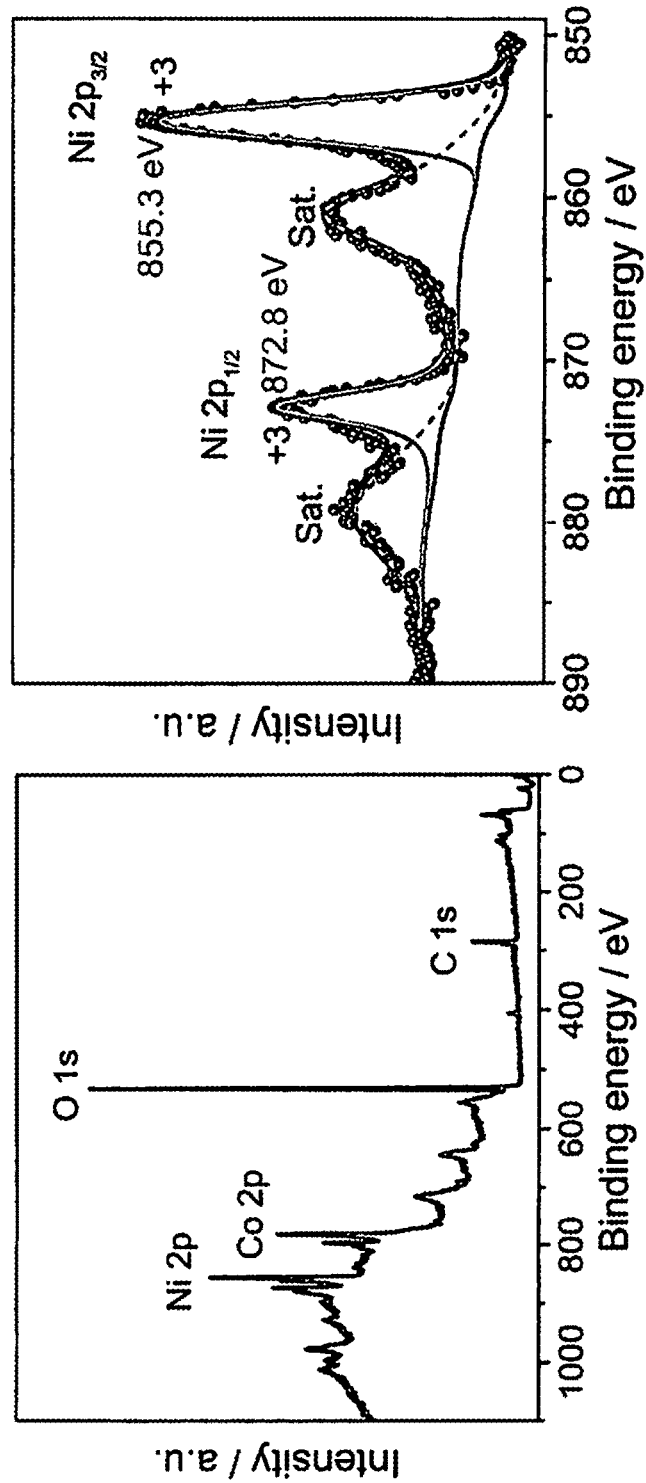
FIGS. 11A, 11B, 11C, and 11D are plots showing X-ray photoelectron spectroscopy (XPS) of ultrathin mesoporous NiCoO nanosheets in the battery of FIG. 8A.
Figure 11D:
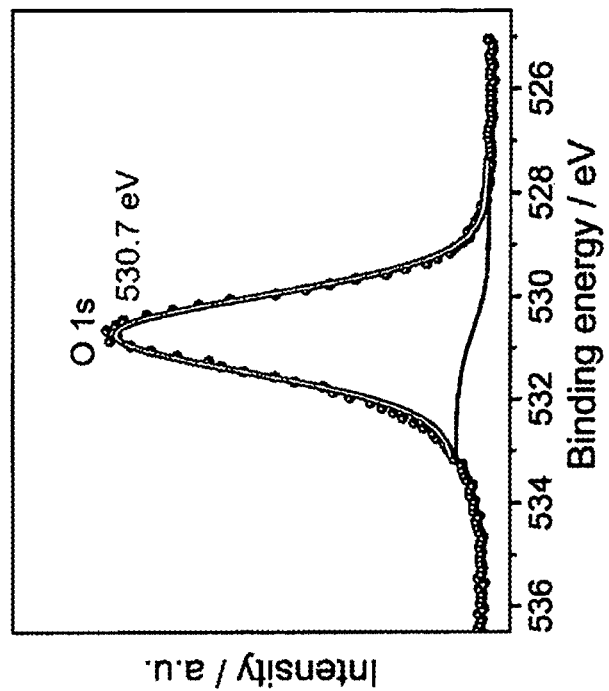
Figure 11C:
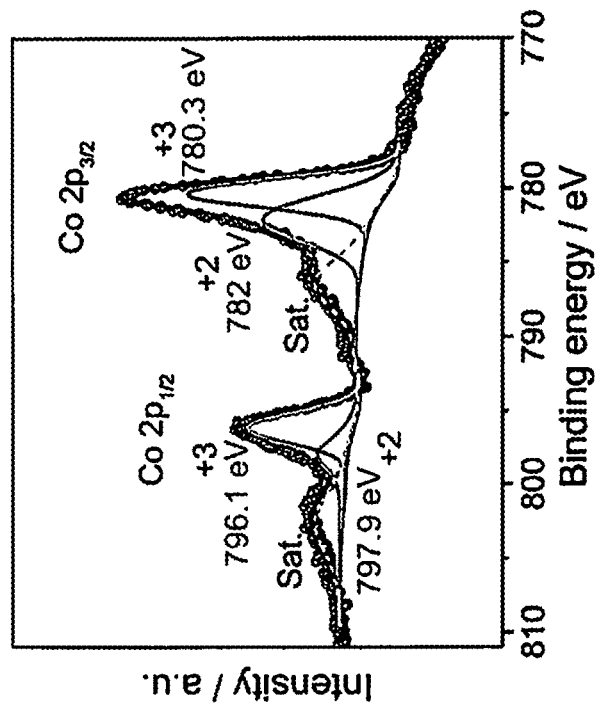

With reference to FIG. 11A, there is shown a full spectrum ranging from 0-1100 eV, clearly displaying the strong peaks of main elements. Also referring to FIGS. 11B to 11D, besides two satellite peaks (indicated as "Sat."), the Ni 2p high-resolution spectrum contains typical peaks located at 855.3 eV and 872.8 eV, characteristic of $Ni^{3+}$. The Co 2p spectrum is best fitted with two spin-orbit doublets, suggesting the existence of $Co^{3+}$ and $Co^{2+}$. The atomic ratio of $Co^{3+}$ to $Co^{2+}$ is calculated to be about 3:2 according to their peak areas integrated from the XPS spectrum. The O 1s spectrum indicates OH groups at 530.7 eV. These data show that the surface composition of the NiCoO hydroxide contains $Ni^{3+}$, Co3+ and Co2+. Combined with the aforementioned elemental atomic ratio, the formula of NiCoO could thus be approximately expressed as $Ni^{3+}Co^{2+}_{0.4}Co^{3+}_{0.6}O_3H_{0.4}$.

Figure 12A:
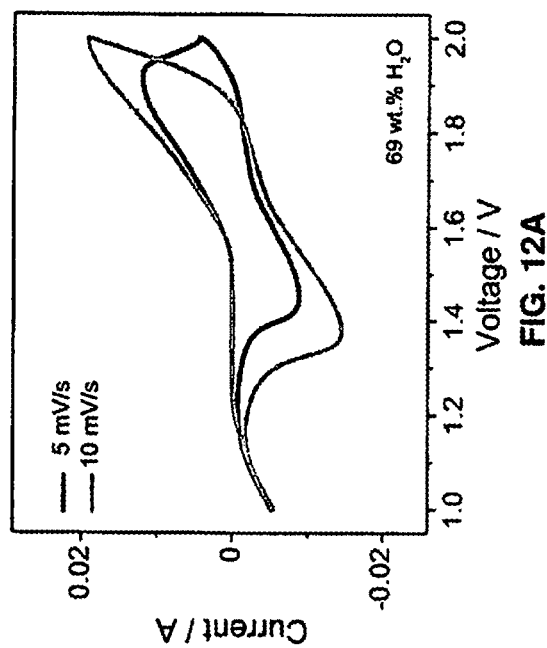
FIGS. 12A, 12B, 12C, 12D, 12E, 12F, and 12G are plots showing the electrochemical performance of Zn//NiCo batteries of FIG. 8A including the PANa polyelectrolyte of FIG. 1.

The inventors have evaluated the performances of the fabricated Zn//NiCoO battery 800A. With reference to FIG. 12A, there is shown a cyclic voltammetry (CV) profiles of the solid-state Zn//NiCo battery 800A at various scan rates demonstrate obvious redox peaks. With the increase of scan rate, the redox peaks in CVs gradually deviate from equilibrium potentials due to higher ionic transfer resistance dominated by diffusion limitation.

Figure 12C:
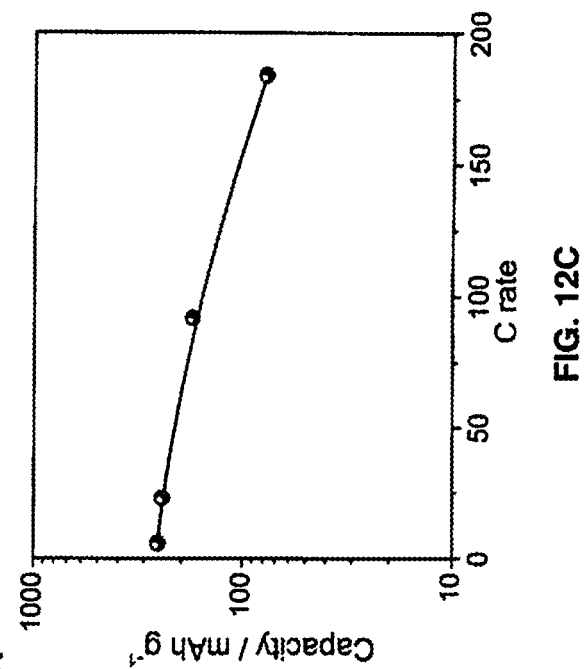
Figure 12B:
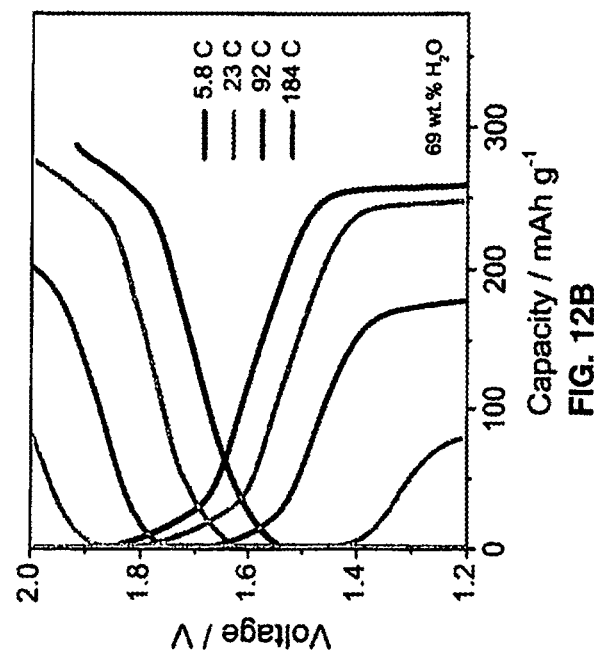

With reference to FIG. 12B, there is shown the galvanostatic charge/discharge (GCD) curves at high rates ranging from 5.8 C to 184 C (1 C=260 mAh g-1). All these GCD curves demonstrate typical charge and discharge plateaus with a gradually increased voltage hysteresis.

With reference to FIG. 12C, the solid-state Zn//NiCo battery shows an excellent rate capability, delivering high capacities of 259, 247, 178 and 79 mAh $g^{-1}$ at 5.8 C, 23 C, 92 C and 184 C, respectively.

Even at the ultrahigh rate of 184 C, the battery can still deliver a capacity of 79 mAh $g^{-1}$, revealing the excellent rate capability. Such high rate capability reveals the batteries may be charged rapidly. This is believed to fundamentally result from the excellent ionic conductivity of the PANa hydrogel electrolyte. With reference to FIG. 12D, GCD curves of the Zn//NiCo battery using 1 mm- and 3 mm-thickness PANa film electrolytes overlay completely, suggesting that the ionic conductivity in the PANa hydrogel electrolyte is excellent.

Figure 12E:
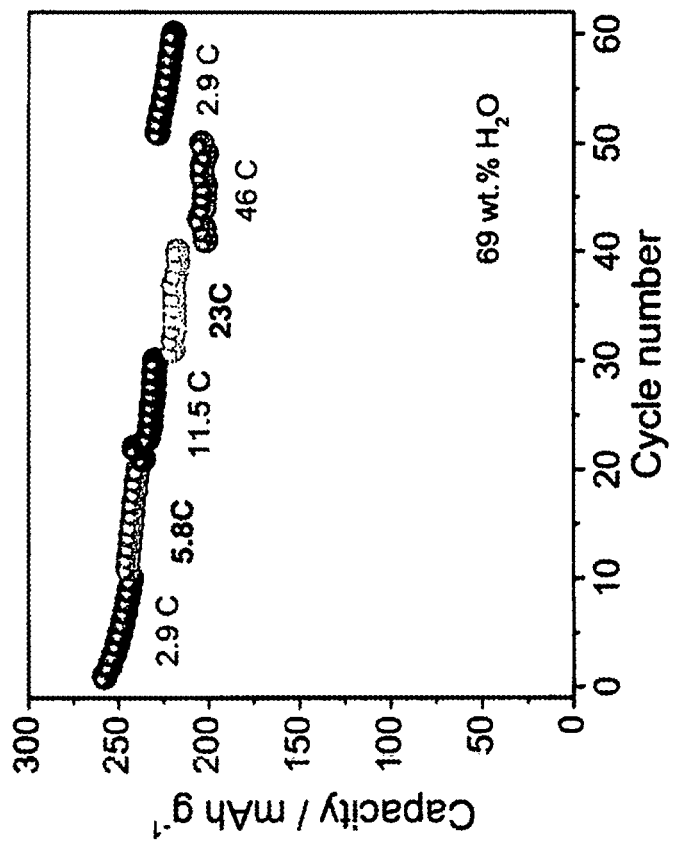
Figure 12D:
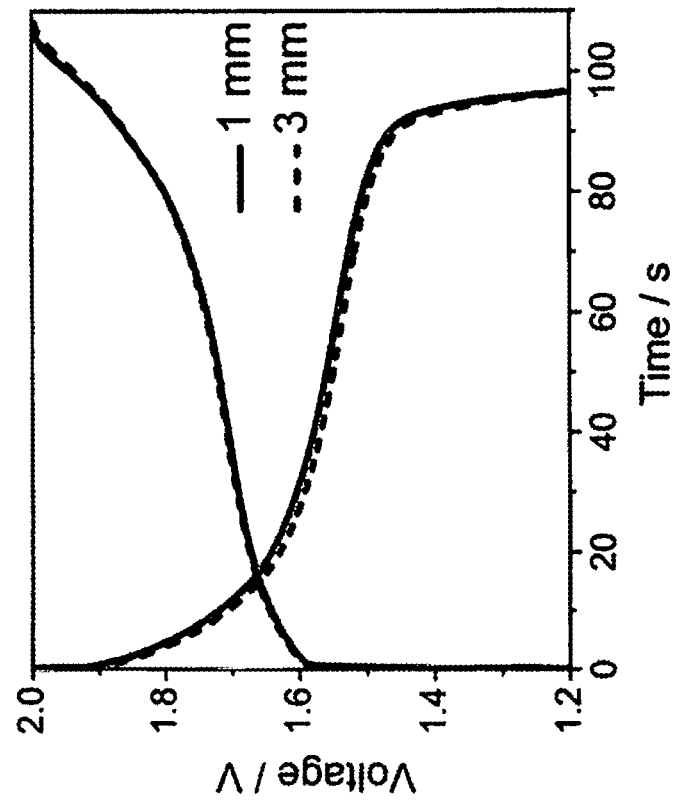

With reference to FIG. 12E, the rate stability is also measured at various rates ranging from 2.9 C to 46 C. At the high rates of 23 C and 46 C, the battery delivers stable discharge capacities of 219 mAh $g^{-1}$ and 203 mAh $g^{-1}$, respectively. After being cycled at 46 C, an average discharge capacity of 223 mAh g-1 being equivalent to 90% of the initial number (249 mAh g-1) is still recovered at 2.9 C. These results evidently demonstrate the stable high-performance of the battery utilizing the hydrogel polyelectrolyte. The electrochemical performance of the PANa polyelectrolyte is tunable, depending on the concentrations of water, $OH^-$ and $Zn^{2+}$.

With reference to FIGS. 13A to 13D, the contents of water, $OH^-$ and $Zn^{2+}$ all affect the battery performances. With increased water content in the PANa polyelectrolyte, CV and GCD curves get larger. In addition to water content, the absence of $Zn^{2+}$ in the PANa polyelectrolyte evidently reduces CV and GCD. It may be observed the performance of PANa polyelectrolyte without $Zn^{2+}$, though at a higher water content, is inferior. It delivers a much lower capacity at a lower C rate. Remarkably, the absence of both $Zn^{2+}$ and $OH^-$ jeopardizes the battery performance. The battery displays no redox peaks in the CV and could not be charged/discharged. All these results reveal the important role that transportation of available ions plays during the electrochemical dynamic process. The enhanced capacities can be attributed to high ion mobility at high water and ion contents and convenient ion transfer in the moisturized electrolyte/electrode interface. Electrochemical impedance spectroscopy measurements also reflect these results. The batteries exhibit small charge transfer resistance (i.e., diameter of the semi-circle) at high water and ion contents. The sufficiently extended polymer chains favor ion transportation in the electrolyte and at the electrolyte/electrode interface, thereby reducing the resistance and increasing the capacity.

Figure 14A:
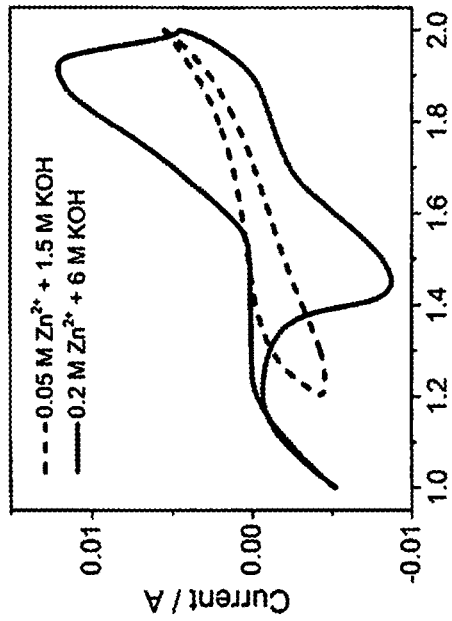
FIGS. 14A, 14B, and 14C are plots showing the electrochemical performance of Zn//NiCo batteries of FIG. 8A including the PANa polyelectrolyte of FIG. 1 with different contents of $Zn^{2+}$+$OH^-$.
Figure 14C:
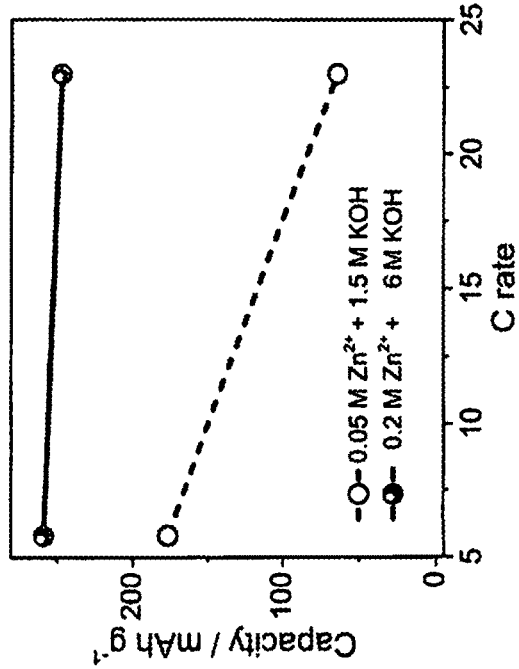
Figure 14B:
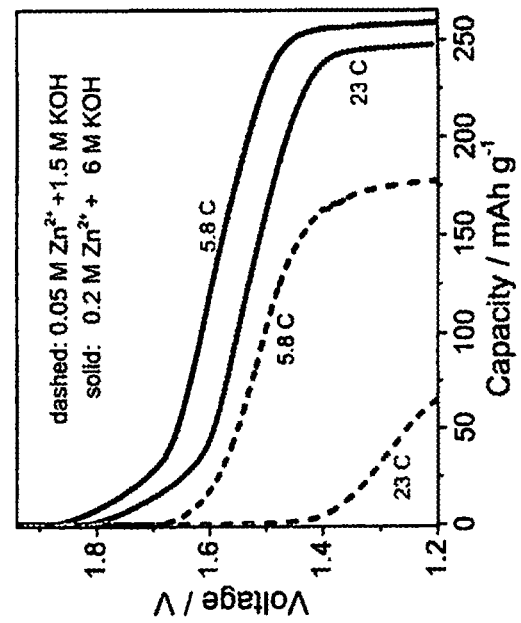

With reference to FIGS. 14A to 14C, consistent with results from previously optimized ion content, the high concentration of 0.2 M $Zn(CH_3COO)_2$+6 M KOH greatly improves the battery performance: obvious redox peaks in the CV, much higher discharge plateaus and capacities at all C rates. This is because this high concentration provides high ionic conductivity.

Figure 15A:
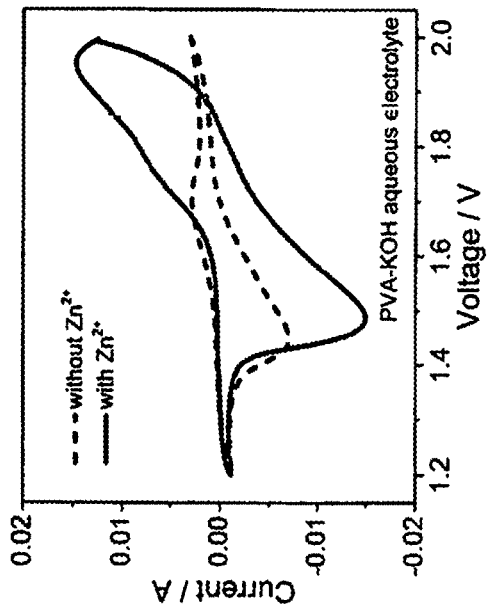
FIGS. 15A, 15B, and 15C are plots showing the electrochemical performances of Zn//NiCo batteries using PVA-KOH electrolyte at liquid state with and without $Zn^{2+}$.
Figure 15C:
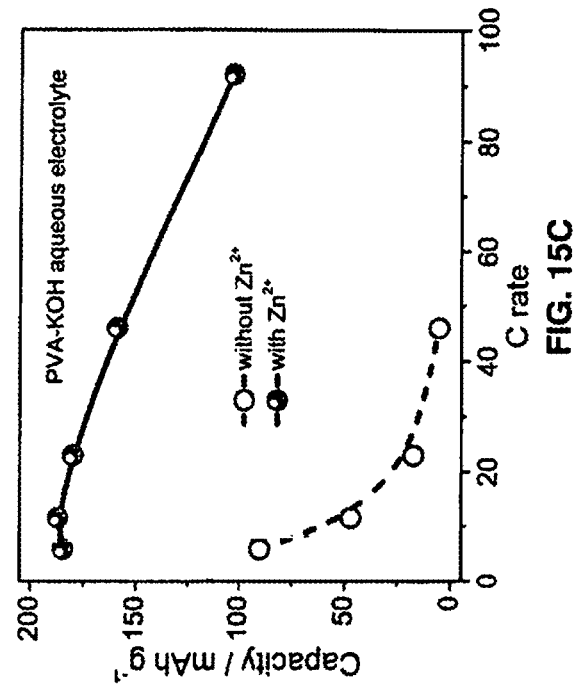
Figure 15B:
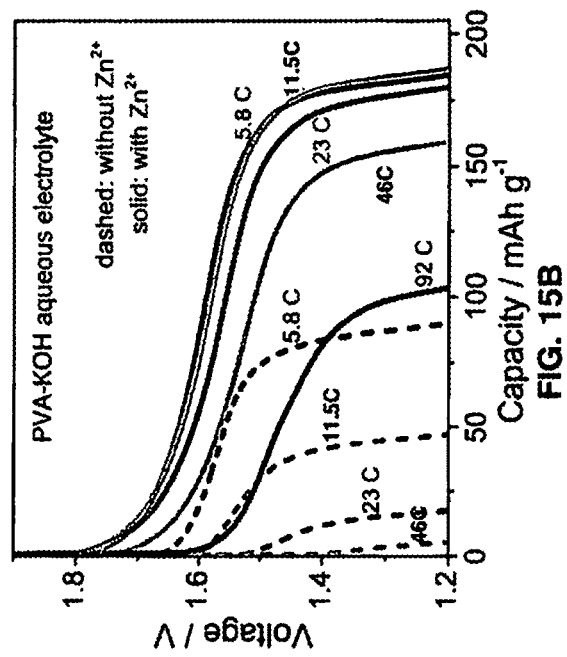

With reference to FIGS. 15A to 15C, for direct comparison with the PANa polyelectrolyte, Zn//NiCo batteries with different electrolytes including PVA and PANa are compared. It is observed that the existence of $Zn^{2+}$ in electrolytes may improve the battery performance: strong redox peaks in the CV, much higher discharge plateaus and capacities at all C rates. It is important to note that $Zn^{2+}$ is always absent in some polymer electrolytes such as PVA- and gelatin-based electrolyte.

It is also observed that, although a high concentration of 6 M KOH+0.2 M $Zn(CH_3COO)_2$ has demonstrated high battery performances, it may not compatible with PVA to form a free-standing film electrolyte. Therefore, only a diluted concentration may be used in PVA, thus the performance is naturally inferior.

Figures 16A, 16B:
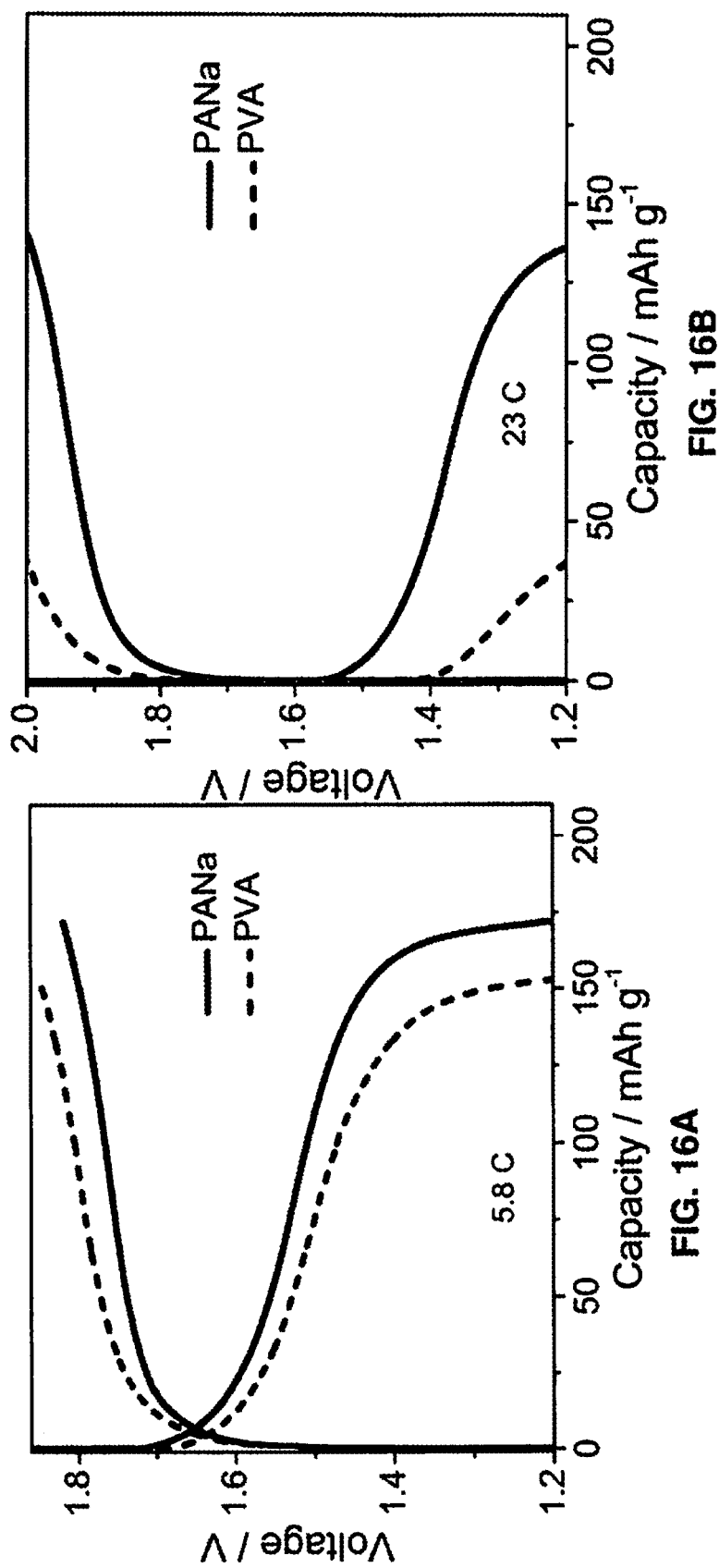
FIGS. 16A and 16B are plots showing the electrochemical performances of solid-state Zn//NiCo batteries with PANa (solid) and PVA (dashed) as electrolytes with identical contents of water (81.1%), $Zn(CH_3COO)_2$ (0.065 M) and KOH (1.95 M)

With reference to FIGS. 16A to 16B, there is shown an electrochemical performances of solid-state Zn//NiCo batteries with PANa and PVA as electrolytes with identical contents of water (81.1%), $Zn(CH_3COO)_2$ (0.065 M) and KOH (1.95 M) operating with different currents of a, 5.8 C. b, 23 C. In spite of identical contents of water, $Zn(CH_3COO)_2$ and KOH in each electrolyte, the solid-state battery using PANa shows superior performances than that using PVA.

Figure 12F:
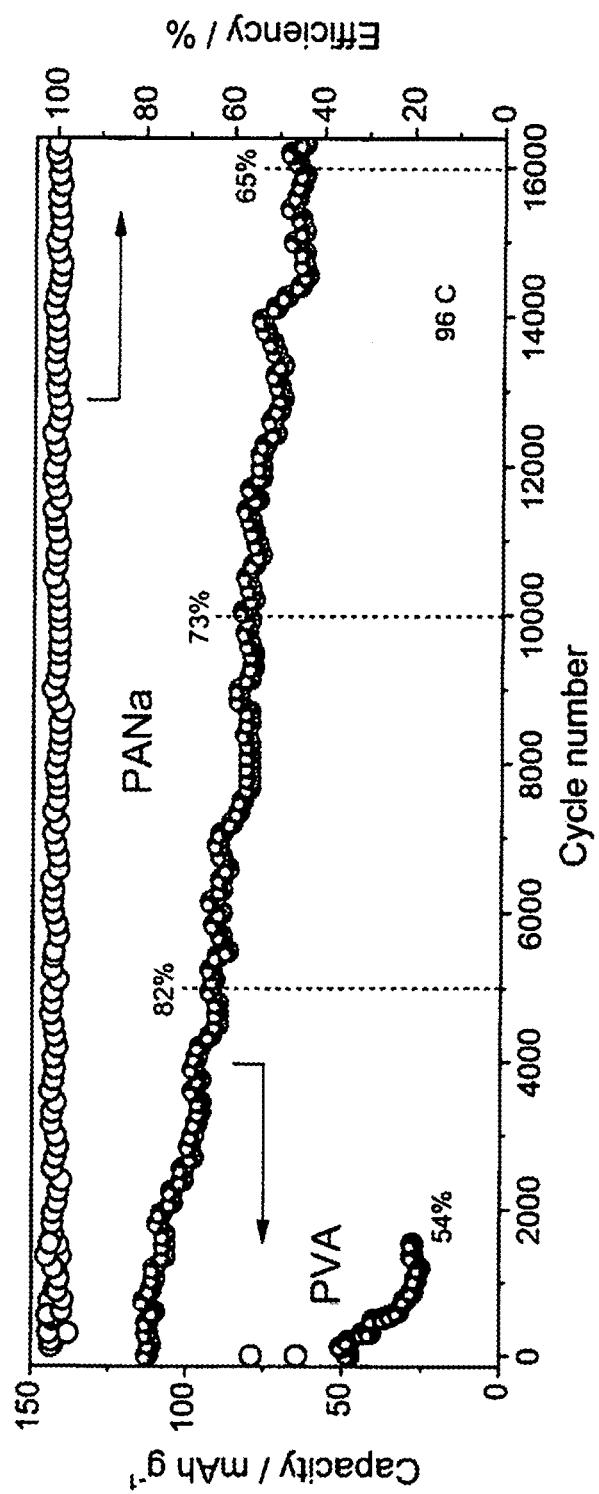

With reference back to FIG. 12F, the solid-state Zn//NiCo battery exhibits excellent long-term cycling stability. Capacity retentions after 5000 and 10000 cycles at a high rate of 96 C are 82% and 73%, respectively. Even when suffered more than 16000 cycles, the battery still maintains 65% capacity. Some slight capacity fluctuations during cycling are observed and could attributed to small disturbances from temperature etc. In contrast, the battery with PVA electrolyte degrades rapidly, only retaining 54% of initial capacitance (48 mAh $g^{-1}$) after merely 1500 cycles at the same rate.

Figure 12G:
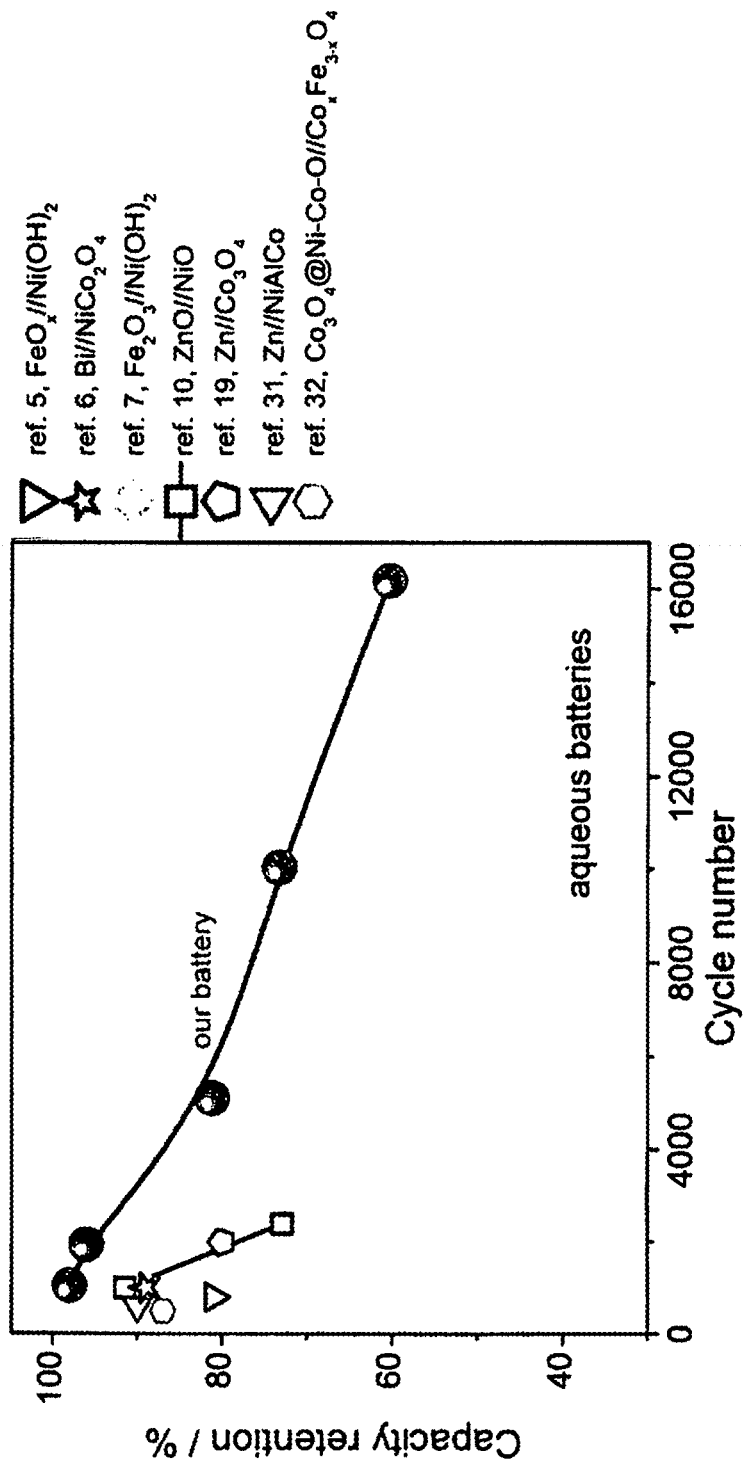
Figure 13D:
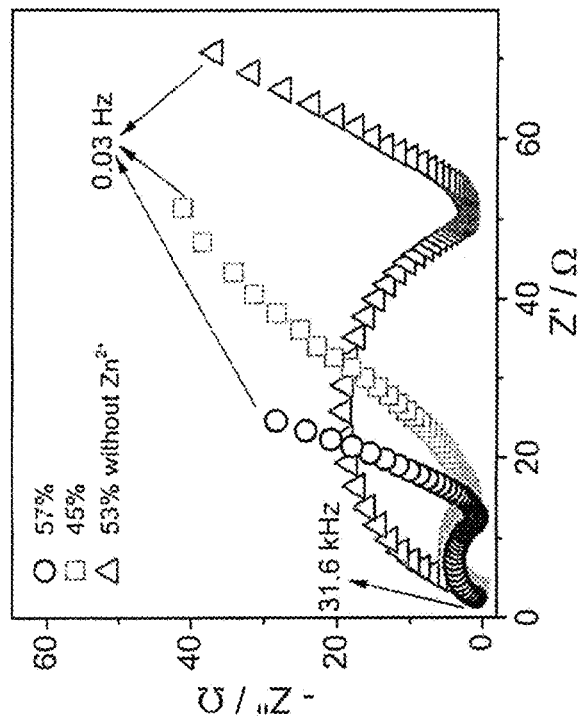
Figure 13C:
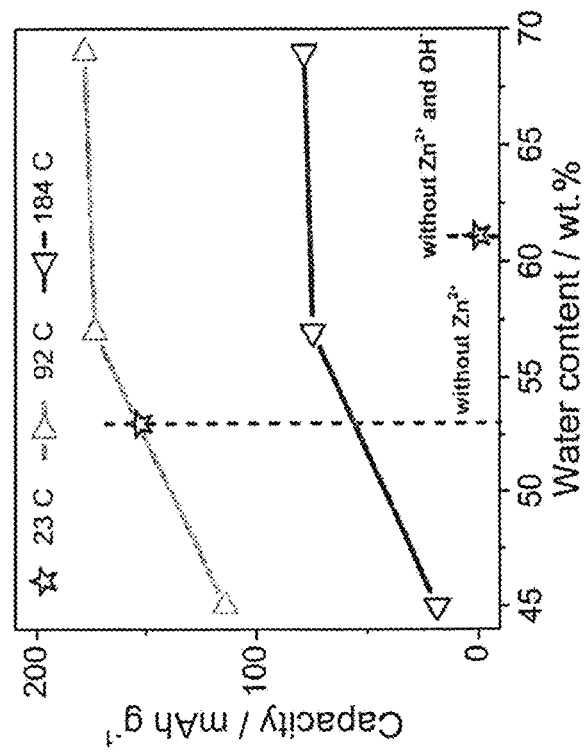

With reference to FIG. 12G, the battery in accordance with the embodiment of the present invention demonstrates a far better performance stability than some example batteries with liquid-state electrolytes, such as Zn//NiAlCo (90% after 600 cycles), $Fe_2O_3$//Ni(OH)$_2$ (89% after 1000 cycles), Bi//NiCo$_2$O$_4$ (89% after 1000 cycles), Co$_3$O$_4$@Ni—Co—O//Co$_x$Fe$_{3-x}$O$_4$ (87% after 500 cycles), FeO$_x$//Ni(OH)$_2$ (81% after 800 cycles), Zn//Co$_3$O$_4$ (80% after 2000 cycles), ZnO//NiO (72.9% after 2400 cycles), etc. The ultra-long cycling stability is clearly an order of magnitude higher than some alkaline rechargeable batteries.

With reference to FIG. 17A, even when the PANa hydrogel electrolyte is completely exposed in air without any packaging, the battery demonstrates a similar long-term cycling stability with capacity retentions of 82% and 56% after 5000 and 10000 cycles, respectively.

In contrast, referring to FIG. 17B, the battery with PVA electrolyte exposed in air degrades more rapidly, only retaining 54% of initial capacitance (37 mAh $g^{-1}$) after merely 875 cycles.

Figures 18A, 18B:
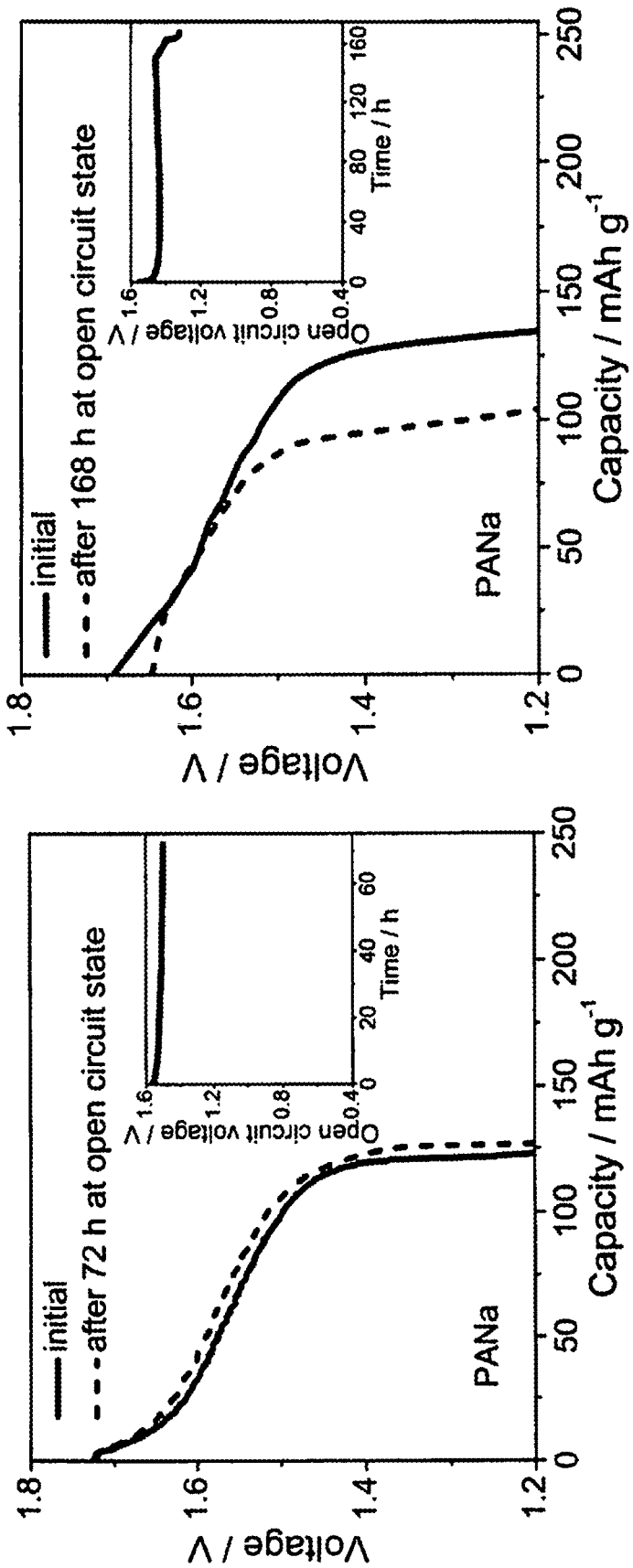
FIGS. 18A, 18B, 18C, and 18D are plots showing the discharge performances of the Zn//NiCo battery before and after standstill at the open circuit state.
Figures 18C, 18D:
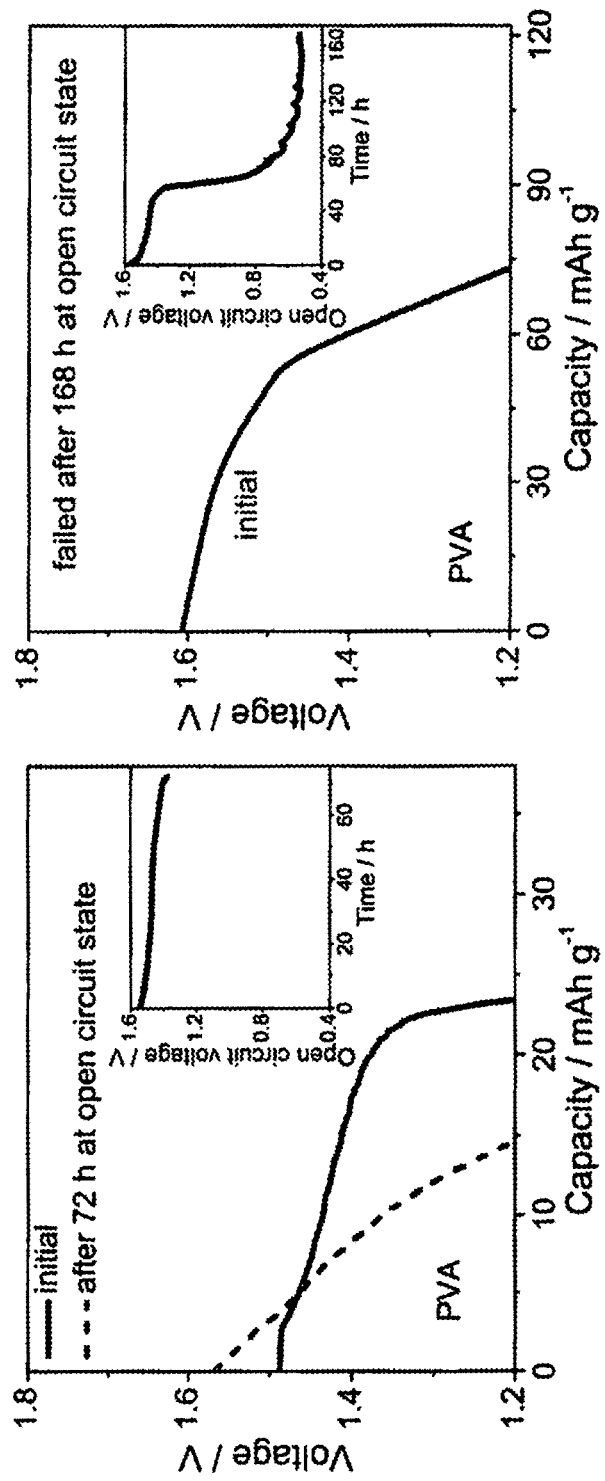

In addition, the battery performances were studied by leaving at the open circuit state for 3-7 days. With reference to FIGS. 18A and 18B, discharge capacity of the battery with the PANa hydrogel electrolyte is well maintained after 3-day standstill at the open circuit, and 81% of the initial capacity (135 mAh $g^{-1}$) is still delivered after 7-day standstill. The open circuit voltage of the battery is almost stable during the whole week. On the other hand, with reference to FIGS. 18C and 18D, battery performances with the PVA electrolyte are totally different. Only 63% of the initial capacity (23.5 mAh $g^{-1}$) is reserved after 3-day standstill at the open circuit, even worse the battery totally fails after 7-day standstill. Its open circuit voltage gradually decreases in the first 3 days and drops terribly to 0.5 V during a week.

Figure 19:
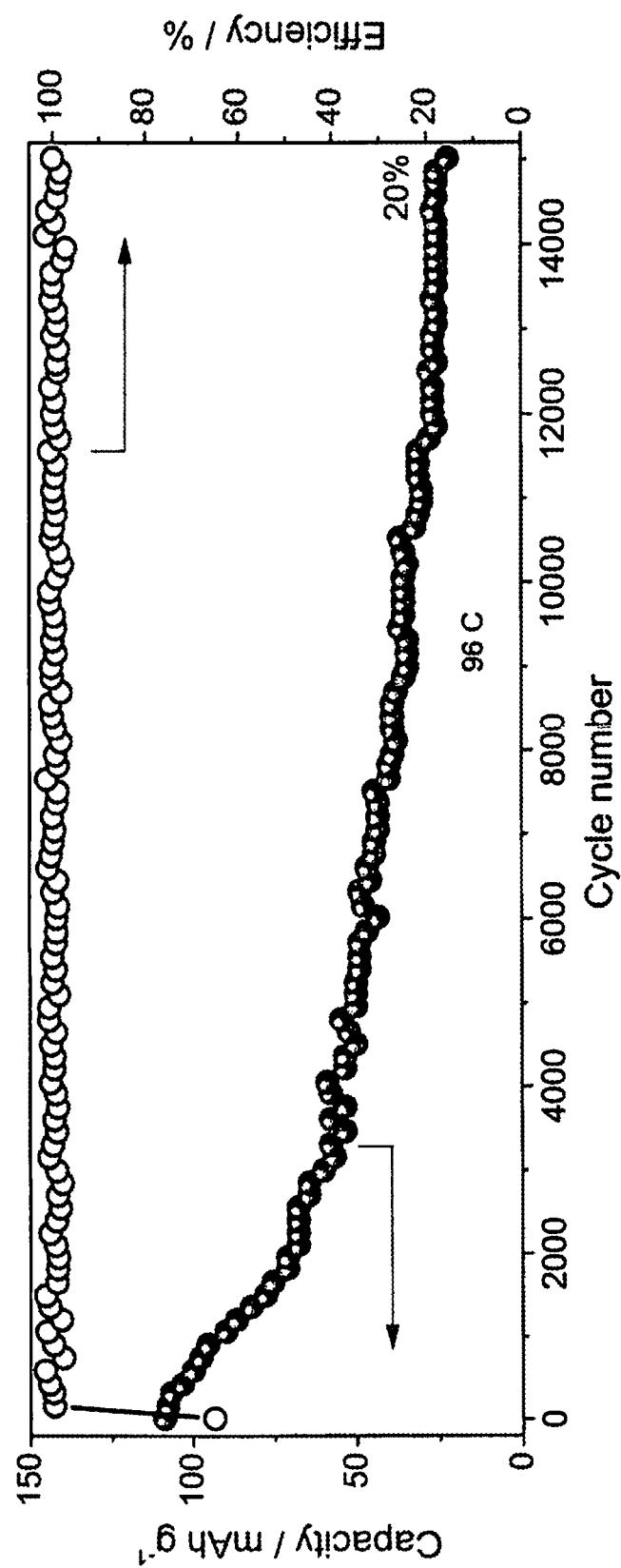
FIG. 19 is a plot showing the cycling performance and the corresponding Coulombic efficiency at 96 C rate of the Zn//NiCo battery with the PANa polyelectrolyte of FIG. 1 after the 7-day standstill at the open circuit state.

With reference to FIG. 19, the battery with the PANa hydrogel electrolyte can continue charge/discharge up to 15000 cycles after the 7-day standstill at the open circuit state, indicating its stable feature.

Advantageously, the rechargeable Zn//NiCo battery based on the PANa hydrogel electrolyte has the features of a high-capacity, ultralong-life, stable, low-cost and safe energy storage device.

In an alternative embodiment, with reference to FIG. 8B, the energy storage apparatus 800B includes an air electrode operating as the cathode 802B of the battery, wherein the cathode 802B comprises an electrocatalysts. The zinc anode may be provided similarly with reference to the previous embodiments of the Zn//NiCoO batteries 800A.

For example, electrocatalysts of Pt/C and $RuO_2$ may be mixed (mass ratio 1:3) and loaded (2 mg $cm^{-2}$) onto a gas diffusion carbon cloth as an air cathode. By directly paving the air cathode 800B and the Zn anode 800A on the as-synthesized PANa film electrolyte 100, free-standing Zn-air batteries are fabricated and tested in static ambient atmosphere.

In an example fabrication process of the battery, a carbon cloth (width: 1 cm; length: 5 cm) was utilized as current collectors. Zn anodes were fabricated by electrodeposition at −0.8 V vs. Zn foil for 5 min in 1 M zinc sulfate at room temperature. In cycling tests, polished Zn foils were used. For the preparation of air cathodes, catalysts of 2.5 mg 60 wt. % Pt on high surface area carbon black and 7.5 mg RuO2 were dispersed in a mixed 1 mL solution of ultrapure water (Milli-Q system, Millipore, Mass. USA), 2-propanol (HPLC grade, Sigma-Aldrich, USA) and a 5.37 wt % Nafion solution (Sigma-Aldrich, USA) with a volume ratio of 36:9:5. 200 microliters of the ink was then transferred onto a gas diffusion carbon cloth with a geometric area of 1 cm2. The air cathode was dried in air for 1 hour before measurement. The Zn anode and the cathode were paved on each side of the PANa film under ambient conditions. Thus, the solid-state batteries were obtained with the electrolyte also serving as a separator.

Figure 20A:
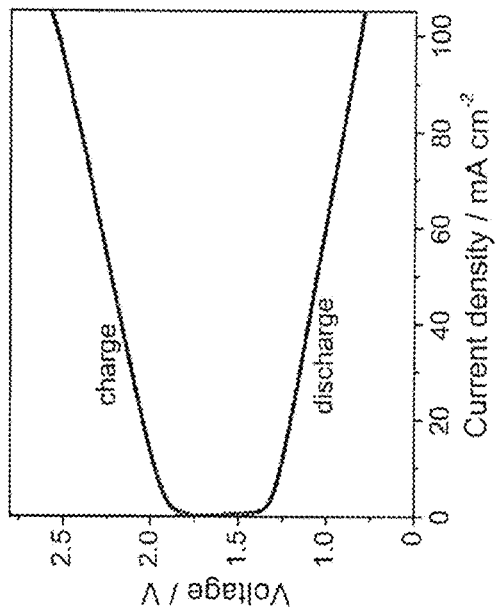
FIGS. 20A, 20B, 20C, 20D, and 20E are plots showing the electrochemical performance of Zn/-air batteries of FIG. 8B including the PANa polyelectrolyte of FIG. 1.
Figure 21B:
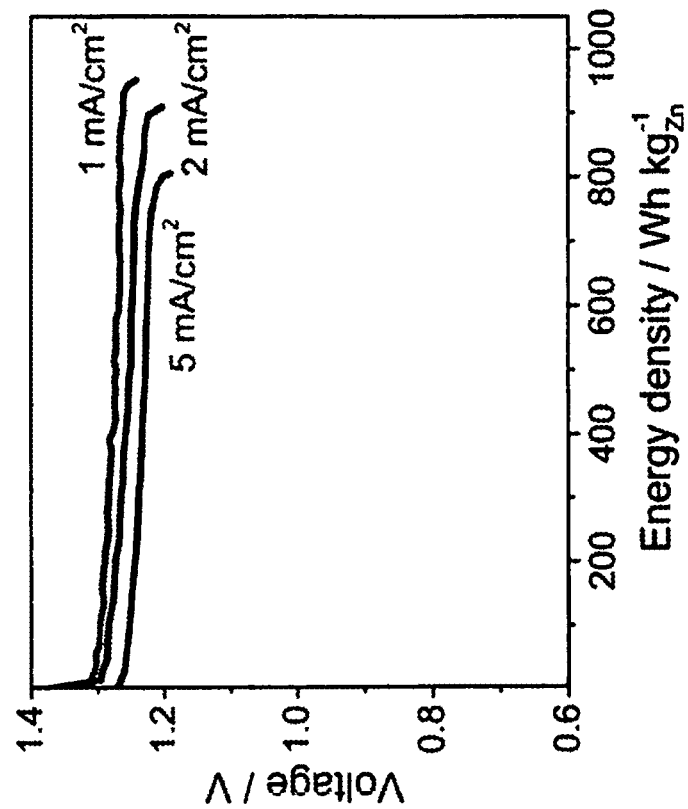
FIGS. 21A and 21B are plots showing the discharge performances of the Zn-air battery of FIG. 8B with the PANa polyelectrolyte of FIG. 1.
Figure 21A:
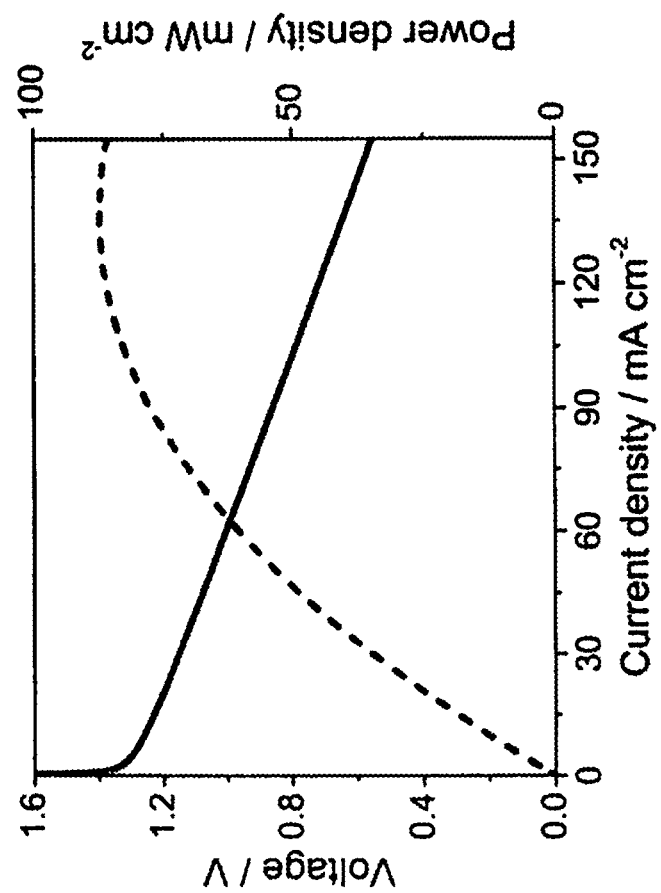

With reference to FIGS. 20A and 21A, it is shown the polarization curves of the rechargeable battery during discharge and charge. The whole charging and discharging overpotential is 1.15 V at a current density of 50 mA $cm^{-2}$. The solid-state battery yields a high power density of 88 mW $cm^{-2}$ at 1.42 V.

Figure 20C:
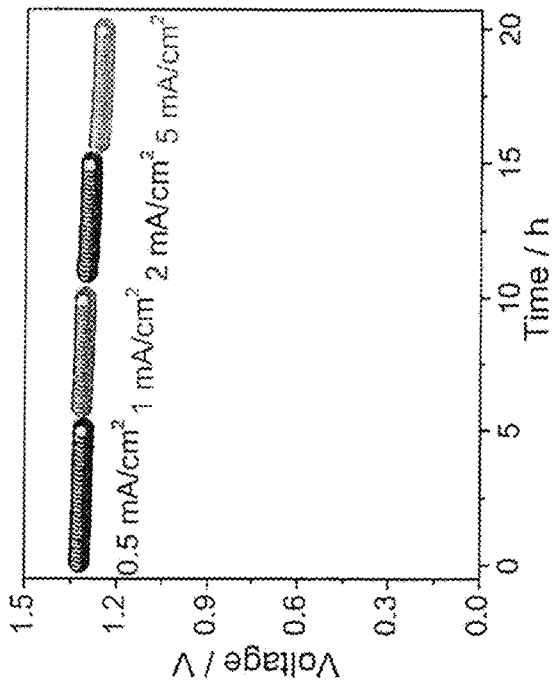
Figure 20B:
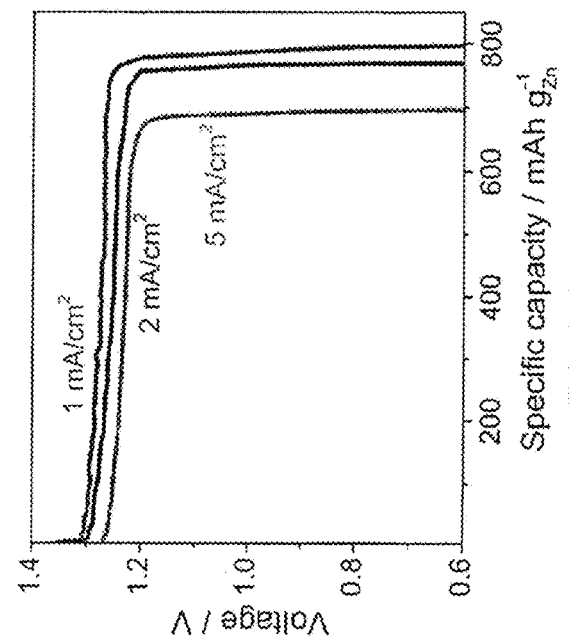

Additionally, with reference to FIGS. 20B and 21B, the specific capacity (normalized to the mass of consumed zinc) of the battery is 795, 770 and 697 mAh $g^{-1}$ at a current density of 1, 2 and 5 mA $cm^{-2}$, respectively. The highest capacity of 795 mAh g$^{-1}$ corresponds to ~97% utilization of a theoretical capacity (~820 mAh g$^{-1}$). These high capacities correspond to large gravimetric energy densities of 952, 909 and 807 Wh kg$^{-1}$.

Figure 22A:
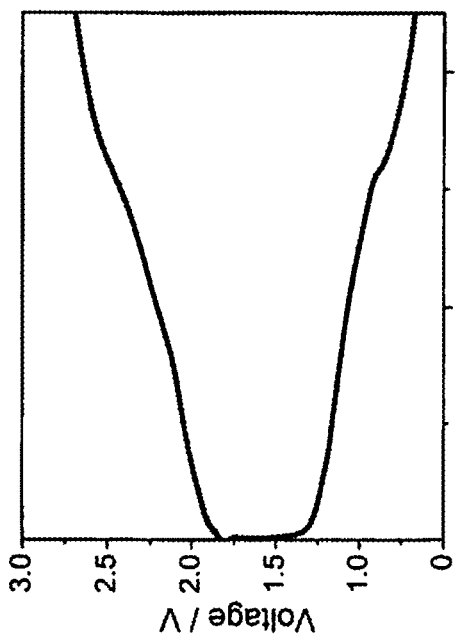
FIGS. 22A, 22B, and 22C are plots showing the electrochemical performances of solid-state Zn-air battery with the PVA electrolyte.
Figure 22C:
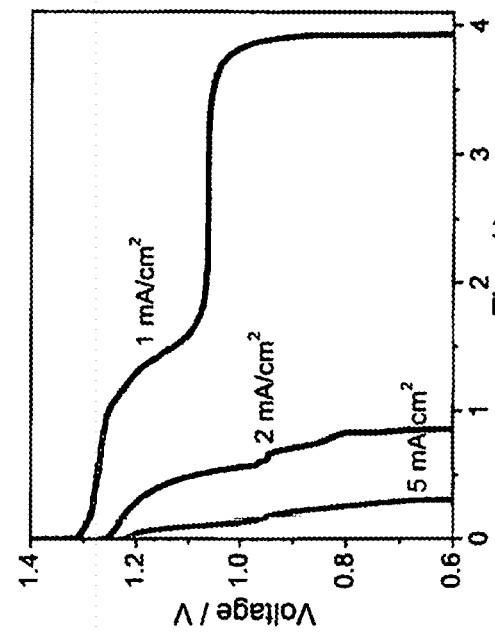
Figure 22B:
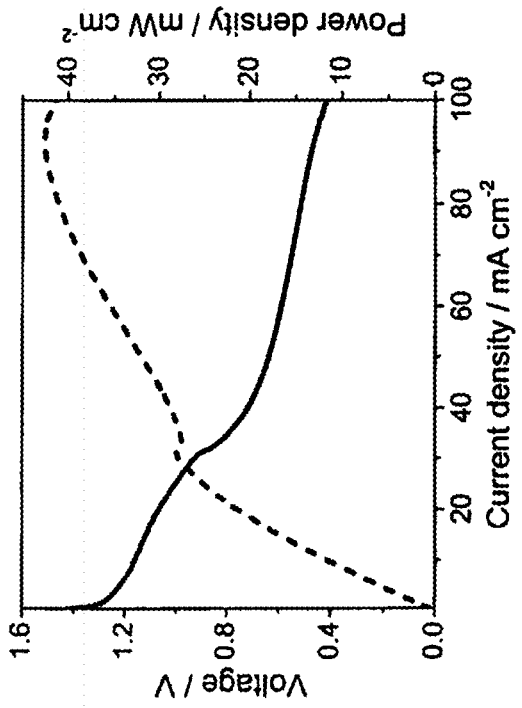

With reference to FIGS. 22A to 22C, compared to the Zn-air battery with the PANa polyelectrolyte, much larger charge-discharge overpotential (1.92 V at a lower current density of 40 mA cm-2) is observed for the Zn-air battery with the PVA electrolyte, indicating a much inefficient rechargeability. Its low power density (<43 mW cm-2) is even less than half of the PANa polyelectrolyte. In addition, the galvanostatic discharge voltage with the PVA electrolyte drops fast to 0.6 V in less than 4 h.

In contrast, with reference to FIG. 20C, the galvanostatic discharge voltage plateaus with the PANa electrolyte are very stable (1.32 V, 1.31 V, 1.29 V and 1.25 V at the discharge current density of 0.5, 1, 2 and 5 mA cm$^{-2}$, respectively).

Figures 20D, 20E:
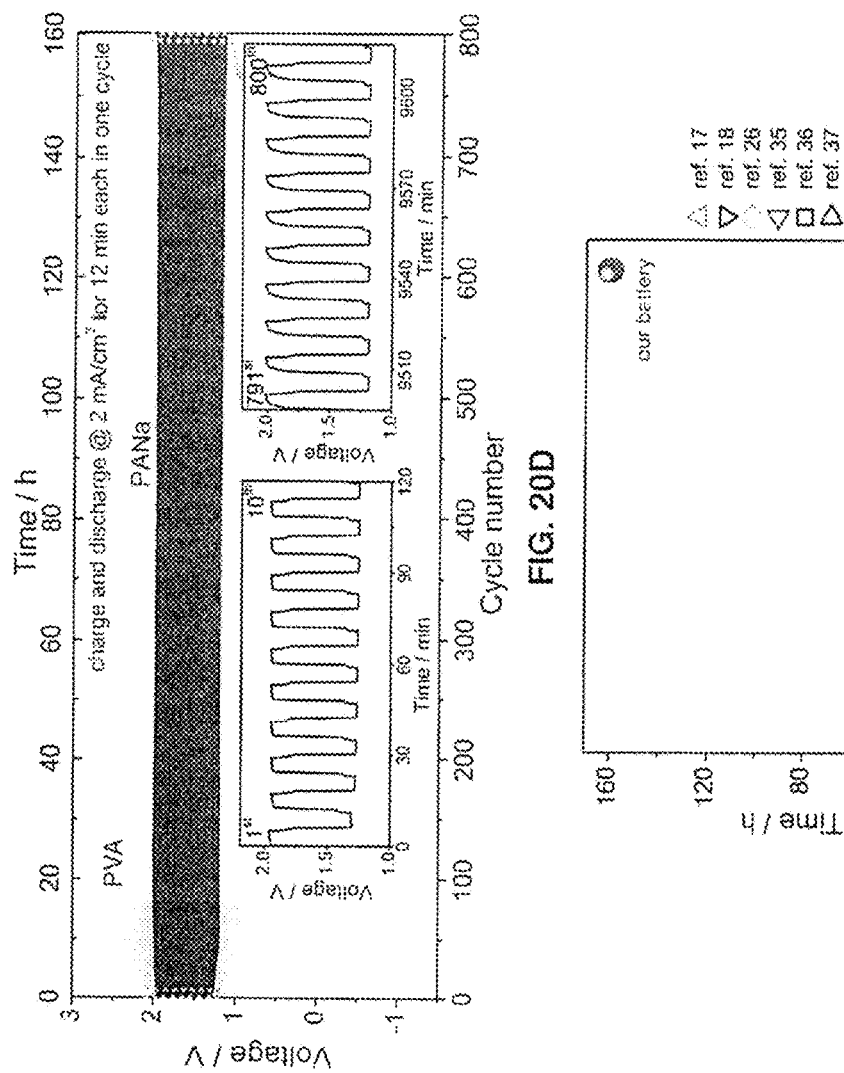
Figure 23:
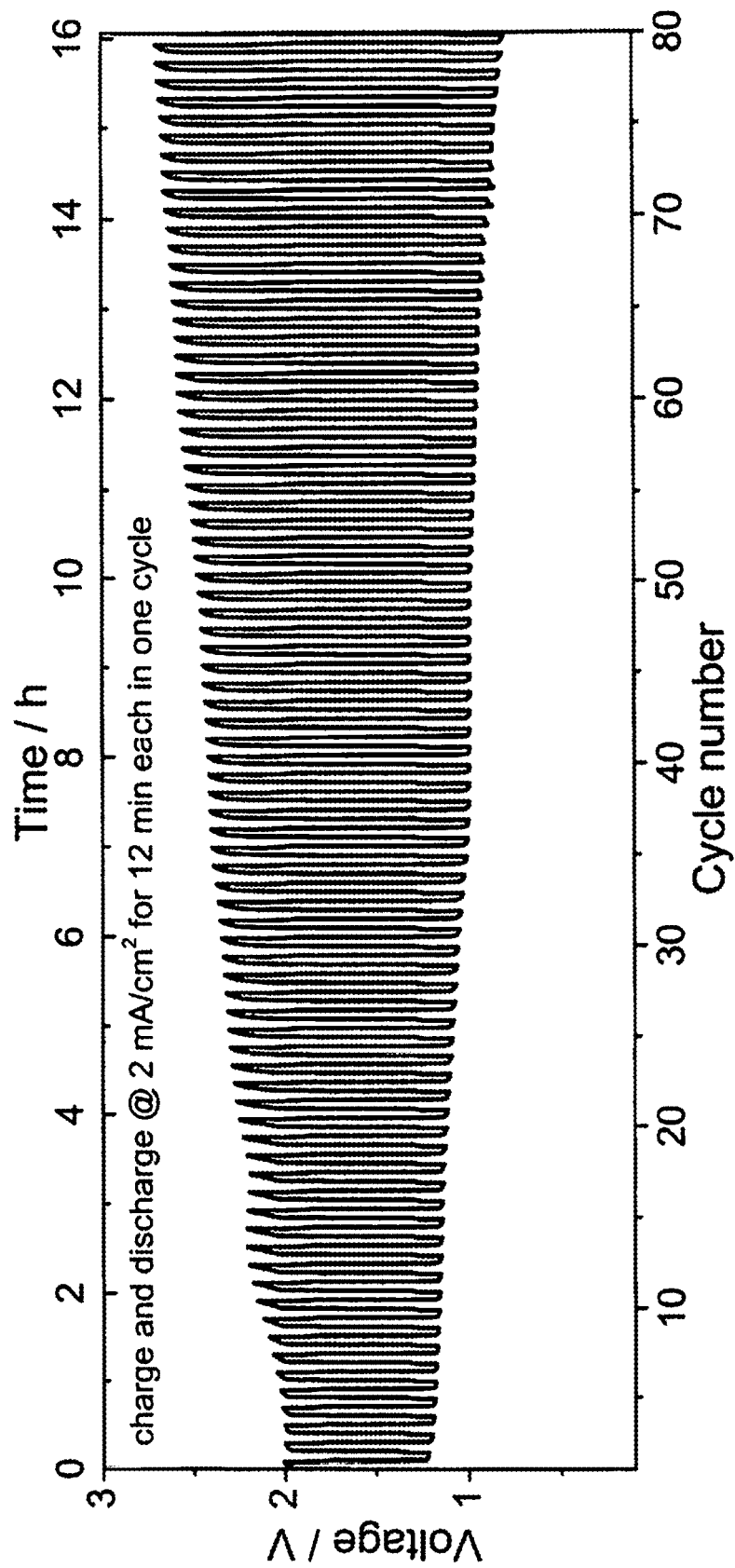
FIG. 23 is a plot showing the galvanostatic charge/discharge cycling of the Zn-air battery with the PVA electrolyte at a current density of 2 mA $cm^{-2}$ with each cycle being 12 min.

With reference to FIG. 20D, there is shown the experimental results of galvanostatic charge/discharge testing on Zn-air batteries at 2 mA cm$^{-2}$ with each cycle being 12 min. A short interval (1 min) between charge and discharge can diagnose the rechargeability and alleviate irreversible side reactions. The battery was cycled 160 h (=800 cycles) without visible voltage change, indicative of the excellent stability of the battery. Initially, the charge and discharge voltages are about 1.97 and 1.29 V (corresponding to charge/discharge overpotential of 0.68 V with a round-trip efficiency of 65.5%). After 800 cycles over a long time of 160 h, the charge and discharge voltages slightly change to 2.02 and 1.2 V (i.e., charge/discharge overpotential of 0.84 V with a round-trip efficiency of 59.4%). Such excellent cycling stability over this long time-scale is even better than that of Zn-air batteries in the tri-electrode systems being tested. In contrast, referring to FIG. 23, the rechargeable Zn-air battery with the PVA electrolyte shows much inferior performances. During merely 80 cycles (=16 h), the charge voltage greatly increases from the initial 2.02 V to 2.73 V, and the discharge voltage dramatically decreases from the initial 1.22 V to 0.8 V.

Figure 24:
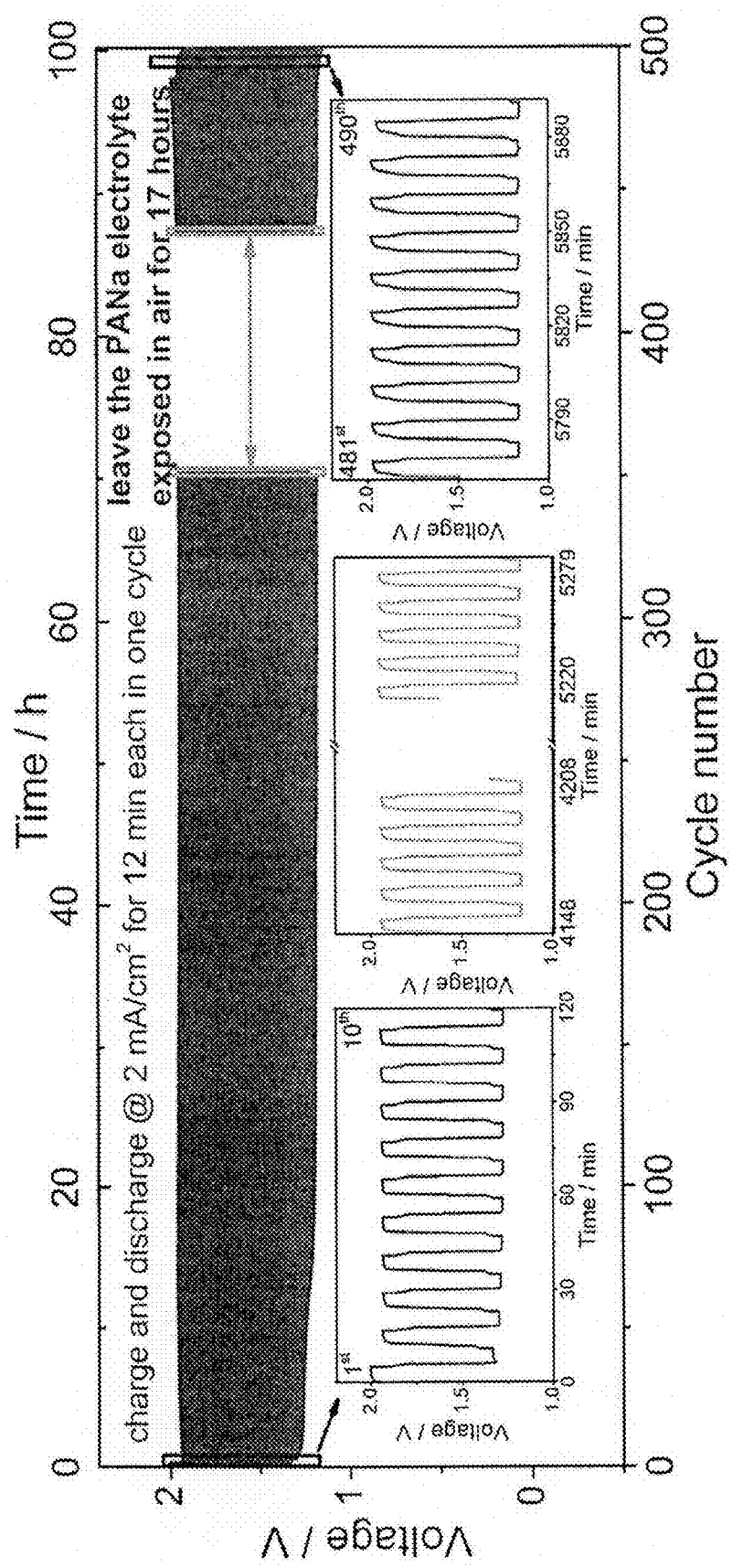
FIG. 24 is a plot showing the galvanostatic charge/discharge cycling of the Zn-air battery of FIG. 8B with the PANa polyelectrolyte of FIG. 1 at a current density of 2 mA cm-2 with each cycle being 12 min, during which the electrolyte was fully exposed in air for 17 hours.

With reference to FIG. 24, after cycle for 70 h, the air cathode was removed and left the PANa polyelectrolyte fully exposed in air for 17 h. Then the same air cathode was paved on the electrolyte and continued to cycle the same battery for an additional 13 h.

Again no significant polarization can be detected on either the charge and discharge segments. Notebably, With reference to FIG. 20E, the battery demonstrates a far best cycling stability among some example solid-state Zn-air batteries, which can merely cycle 30 h with 30 cycles, 12 h with 72 cycles, 8 h with 48 cycles, 6 h with 36 cycles, etc. Like the Zn//NiCo batteries described above, the ultra-long cycling stability is again an order of magnitude higher than those of state-of-the-art solid-state Zn-air batteries.

Figure 25:
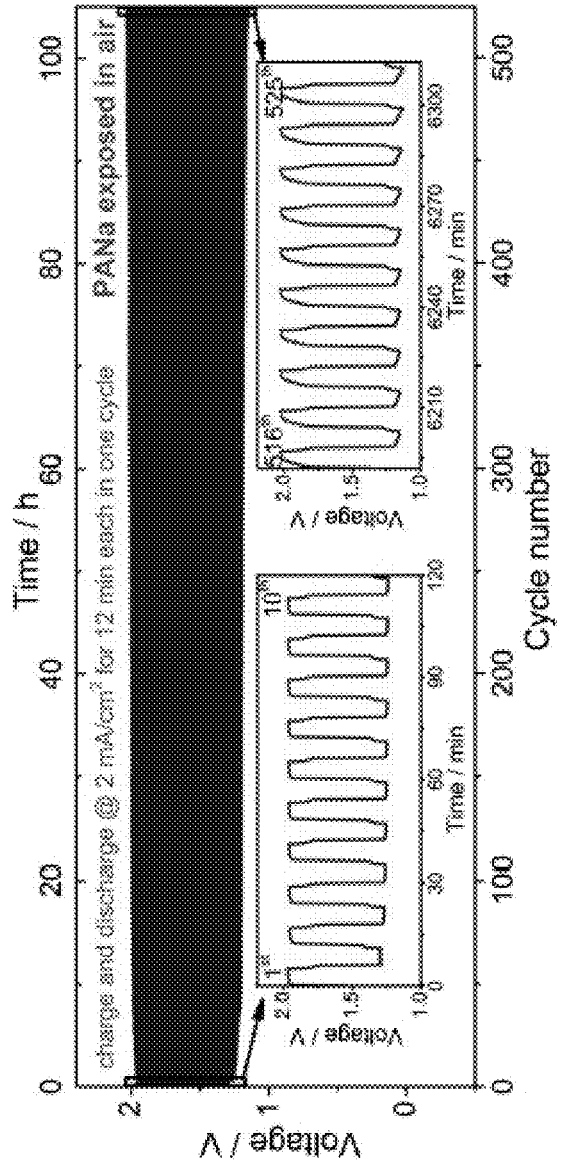
FIGS. 25 and 26 are plots showing the cycling performance of the Zn-air battery with the PANa polyelectrolyte of FIG. 1 and PVA electrolyte respectively, when completely exposed in air without any packaging.

In addition, the cycling stability of solid-state Zn-air batteries is also tested when the electrolyte is completely exposed in air without any packaging. With reference to FIG. 25, the battery with the PANa polyelectrolyte demonstrates a similar long-term cycling stability.

Figure 26:
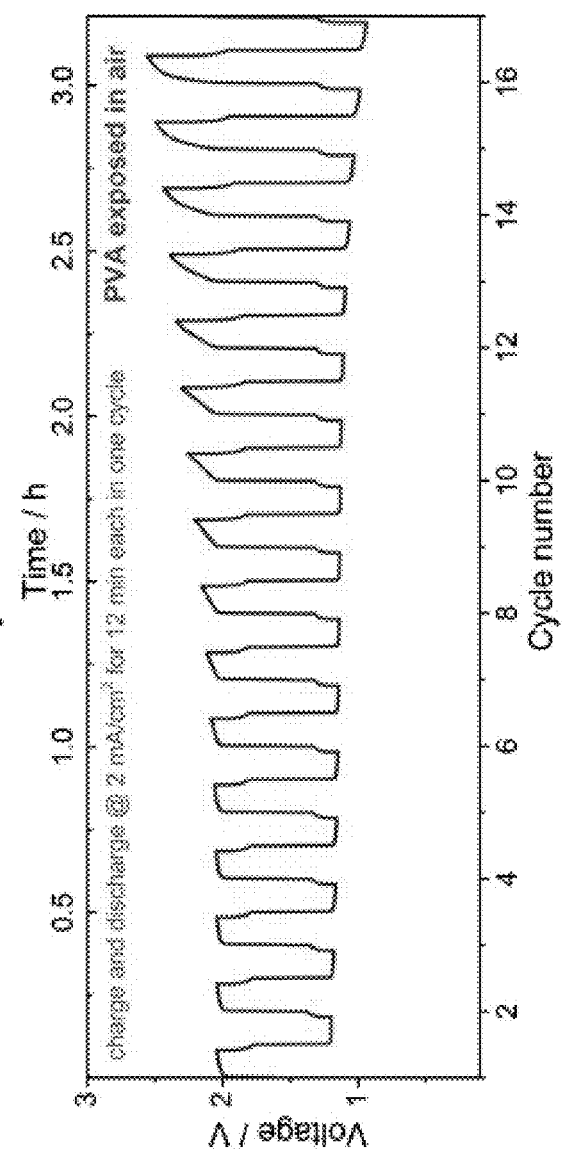

In contrast, with reference to FIG. 26, the battery with PVA electrolyte exposed in air degrades much more rapidly. During merely 17 cycles (=3.2 h), the charge voltage greatly increases from the initial 2 V to 2.55 V, and the discharge voltage dramatically decreases from the initial 1.21 V to 0.95 V.

Figure 27B:
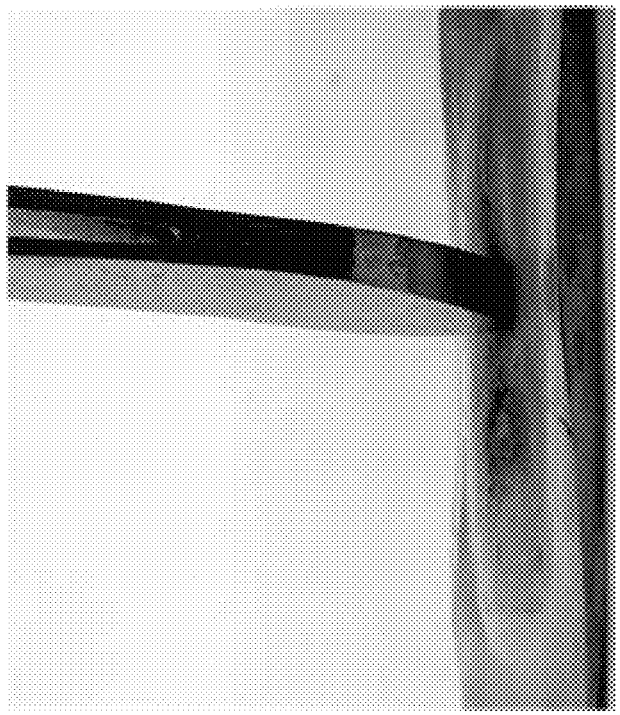
FIGS. 27A and 27B are photographic images of the post-cycled Zn-air battery with the PVA electrolyte (air cathode is removed)
Figure 27A:
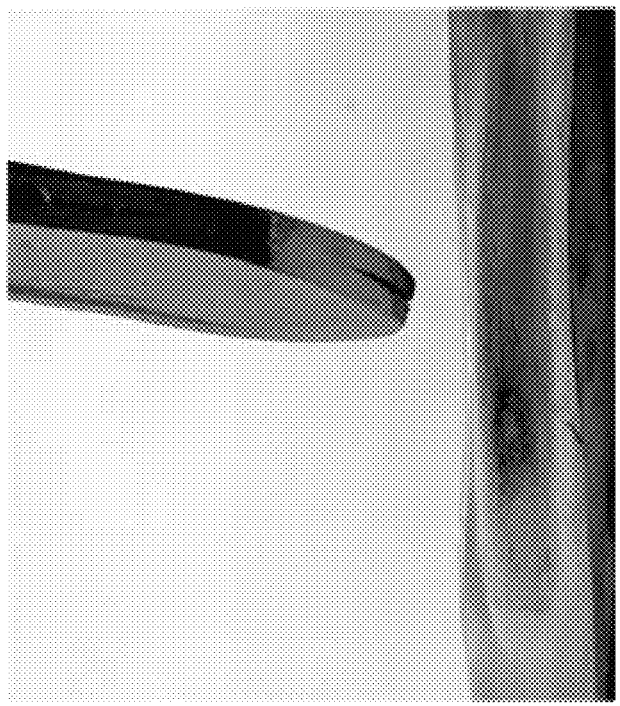

With reference to FIGS. 27A and 27B, the oxygen evolution reaction (OER, dominant reaction in the charge process) produces $O_2$. With PVA electrolyte, the $O_2$ produced cannot be dissolved by the electrolyte and thus gradually passes through the PVA to the Zn anode, eventually form a drum at the Zn electrode/PVA electrolyte interface and therefore their contact is lost. This formed drum terribly jeopardizes the charge/discharge performance due to the greatly increased charge transfer resistance at the interface. It should be noted that the drum is never observed in the case of the PANa.

Figure 28A:
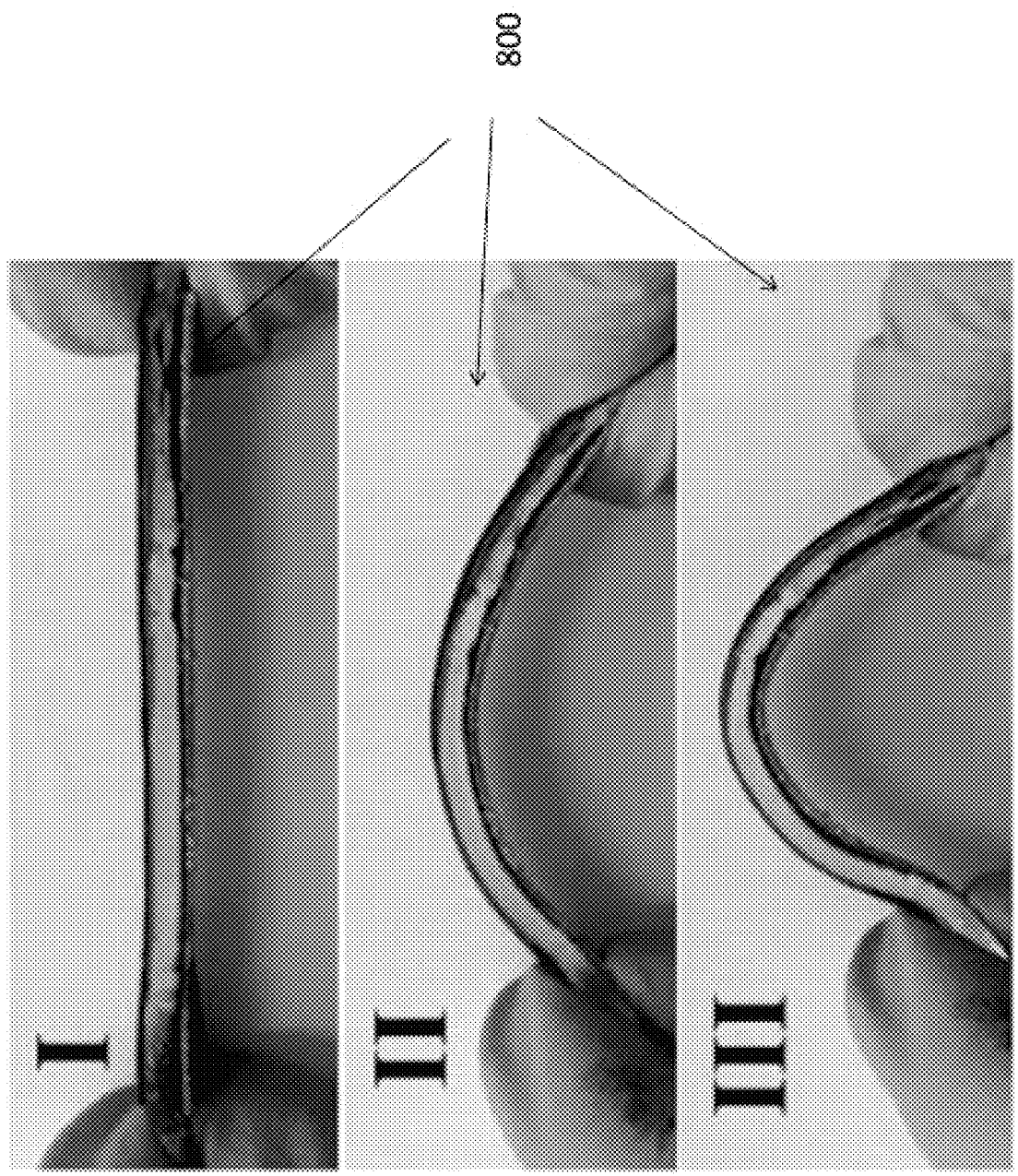
FIGS. 28A, 28B, and 28C are photographic images and plots showing the flexibility and the electrical performances of the Zn-based batteries of FIGS. 8A and 8B under various bending states.
Figure 28B:
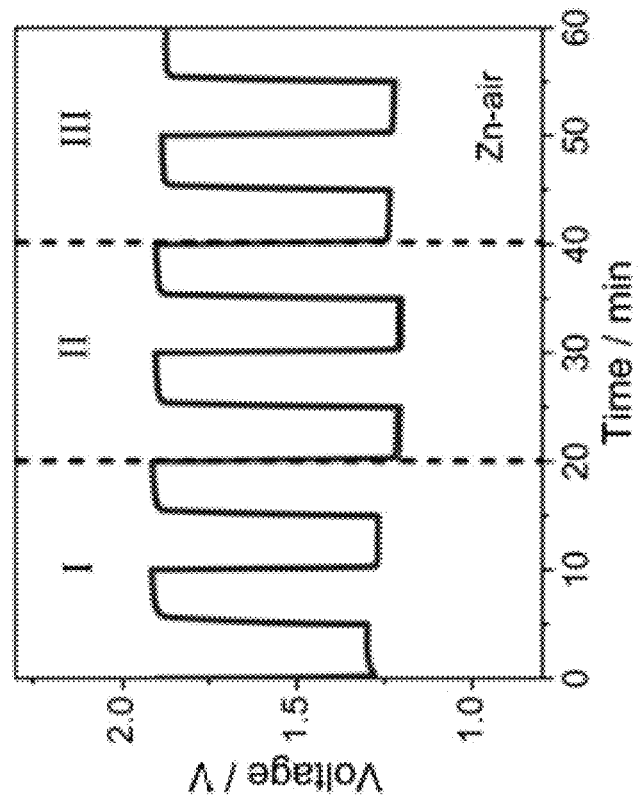
Figure 28C:
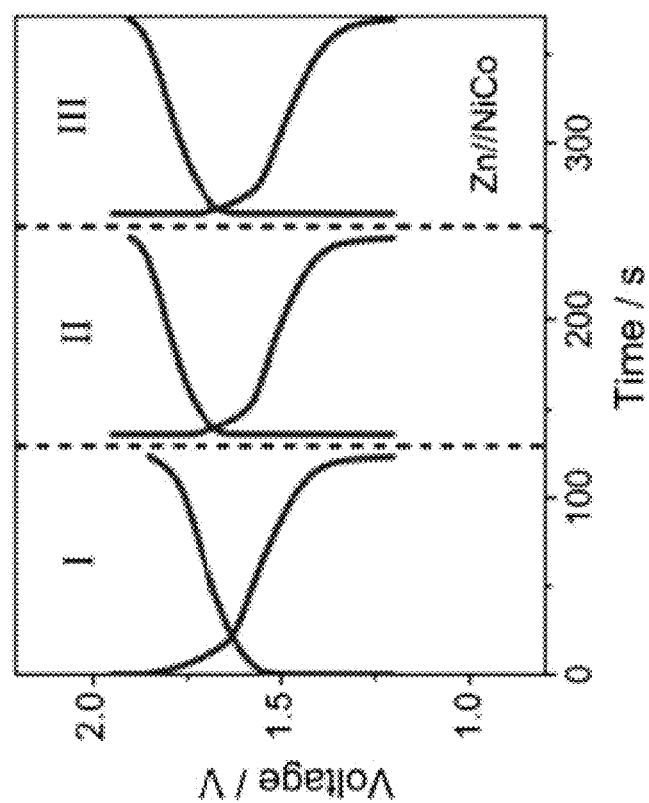

With reference to FIGS. 28A to 28C, the intrinsic flexibility of both electrolyte 100 and electrodes 802 provides the Zn-based batteries 800 with a flexibility. The GCD profiles of both Zn//NiCo 800A and Zn-air batteries 800B remain virtually almost unchanged at different bending states compared to those of the flat batteries (0°), indicative of a robust mechanical integrity.

The battery fabricated in accordance with the embodiments of the present invention is tested in another experiment. With reference to FIGS. 29A to 29C, five Zn-air batteries 800B (each size 3 cm×4 cm) were connected in series and attached to a 350 mAh smart watch 2900 with android system installed. The superior stability of the Zn-air batteries 800B enables a long-term work loading, which is exemplified by continuously charging the smart watch to ~90 mAh in 40 min. All functions of the smart watch 2900 can be used after being charged without any exceptions, including viewing pictures, dialing phones and accessing messages. Advantageously, the batteries 800 can serve as a powerful and reliable energy storage and conversion unit for practical applications.

These embodiments may be advantageous in that the batteries and the new polymeric material may solve the problem of poor cycling stability of aqueous batteries. The solid-state electrolyte achieves extraordinary cycling stabilty of aqueous batteries.

Rechargeable Zn//NiCo and Zn-air batteries based on the polyelectrolyte deliver high capacity and ultra-long cycling stability, which are found to be at least an order of magnitude higher than the aqueous batteries. The extradinary cycling stabilities achieved are attributed to the superior water and ion absorption, water retention and quasi-solid electrolyte interface (quasi-SEI) of the new polyelectrolyte developed.

In addition, for a solid-state aqueous battery, the development of the solid-state electrolyte with proper interactions with water, ions and electrodes may provide a unique and multiplier way to achieve high battery performance, in particular, the charging-discharging cycling stability.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:
1. An energy storage apparatus comprising:
 a pair of electrodes including a zinc anode and a cathode including nickel cobalt hydroxide; and
 an electrolyte sandwiched between the pair of electrodes;
 wherein the electrolyte includes a combination of a polyacrylate-based polymer arranged to retain an ionic solution with a plurality of chemical ions;
 wherein the ionic solution includes zinc acetate and potassium hydroxide;

wherein the polyacrylate-based polymer includes a hydrogel structure; and
wherein the electrolyte is in solid-state;
wherein a quasi-solid electrolyte interface layer is formed based on an electrostatic interaction between electronegatively acrylate groups in the polyacrylate-based polymer and electropositive zinc ions produced from the zinc anode oxidation, the quasi-solid electrolyte interface layer is formed on the zinc anode and at an interface between the zinc anode and the electrolyte including the polyacrylate-based polymer.

2. The energy storage apparatus in accordance with claim 1, wherein the electrodes and the electrolyte are mechanically flexible.

3. The energy storage apparatus in accordance with claim 1, wherein the polyacrylate-based polymer includes sodium polyacrylate.

4. The energy storage apparatus in accordance with claim 3, wherein the quasi-solid electrolyte interface layer is further arranged to suppress a formation of dendrites on an electrode in the energy storage apparatus.

5. The energy storage apparatus in accordance with claim 1, wherein the quasi-solid electrolyte interface is formed based on the electrostatic interaction between the electronegatively polarized lone pairs at the oxygen atom of the acrylate groups in the polyacrylate-based polymer and the electropositively charged zinc anode.

6. The energy storage apparatus in accordance with claim 1, wherein the quasi-solid electrolyte interface is formed during initial charging and discharging cycles of the energy storage apparatus.

7. The energy storage apparatus in accordance with claim 1, wherein the quasi-solid electrolyte interface layer is arranged to immobilize the electropositive zinc ions produced on the zinc electrode based on the electrostatic interaction between the electronegative acrylate group and the electropositive zinc ions.

8. The energy storage apparatus in accordance with claim 7, wherein the electropositive zinc ions are immobilized at the quasi-solid electrolyte interface layer.

9. The energy storage apparatus in accordance with claim 1, wherein each of the electrodes comprises a carbon cloth arranged to retain an electrode material thereon.

10. The energy storage apparatus in accordance with claim 1, wherein the energy storage apparatus is rechargeable.

11. An energy storage apparatus comprising:
a pair of electrodes including a zinc anode and a cathode including an electrocatalyst of $RuO_2$; and
an electrolyte sandwiched between the pair of electrodes;
wherein the electrolyte includes a combination of a polyacrylate-based polymer arranged to retain an ionic solution with a plurality of chemical ions;
wherein the ionic solution includes zinc acetate and potassium hydroxide;
wherein the polyacrylate-based polymer includes a hydrogel structure; and
wherein the electrolyte is in solid-state;
wherein a quasi-solid electrolyte interface is formed based on an electrostatic interaction between electronegative acrylate groups in the polyacrylate-based polymer and electropositive zinc ions produced from the zinc anode oxidation, the quasi-solid electrolyte interface is formed on the zinc anode and between the zinc anode and the electrolyte including the polyacrylate-based polymer.

12. The energy storage apparatus in accordance with claim 11, wherein the electrodes and the electrolyte are mechanically flexible.

13. The energy storage apparatus in accordance with claim 11, wherein the polyacrylate-based polymer includes sodium polyacrylate.

14. The energy storage apparatus in accordance with claim 13, wherein the polyacrylate-based polymer is further arranged to suppress a formation of dendrites on an electrode in the energy storage apparatus.

15. The energy storage apparatus in accordance with claim 11, wherein the quasi-solid electrolyte interface is formed based on the electrostatic interaction between electronegatively polarized lone pairs at the oxygen atom of the acrylate groups in the polyacrylate-based polymer and the electropositively charged zinc anode.

16. The energy storage apparatus in accordance with claim 11, wherein the quasi-solid electrolyte interface is formed during initial charging and discharging cycles of the energy storage apparatus.

17. The energy storage apparatus in accordance with claim 15, wherein quasi-solid electrolyte interface layer is arranged to immobilize the electropositive zinc ions produced on the zinc electrode based on the electrostatic interaction between the electronegative acrylate group and the electropositive zinc ions.

18. The energy storage apparatus in accordance with claim 17, wherein the electropositive zinc ions are immobilized at the quasi-solid electrolyte interface layer.

19. The energy storage apparatus in accordance with claim 11, wherein the cathode includes an air electrode.

20. The energy storage apparatus in accordance with claim 11, wherein each of the electrodes comprises a carbon cloth arranged to retain an electrode material thereon.

21. The energy storage apparatus in accordance with claim 11, wherein the energy storage apparatus is rechargeable.

* * * * *